US011623706B2

(12) United States Patent
Finke

(10) Patent No.: US 11,623,706 B2
(45) Date of Patent: Apr. 11, 2023

(54) PRODUCTION SYSTEM

(71) Applicant: Identytec GmbH & Co. KG, Hildesheim (DE)

(72) Inventor: Thorsten Finke, Algermissen (DE)

(73) Assignee: Identytec GmbH & Co. KG, Hildesheim (DE)

( * ) Notice: Subject to any disclaimer, the term of this patent is extended or adjusted under 35 U.S.C. 154(b) by 11 days.

(21) Appl. No.: 16/981,851

(22) PCT Filed: Mar. 6, 2019

(86) PCT No.: PCT/EP2019/055587
§ 371 (c)(1),
(2) Date: Feb. 19, 2021

(87) PCT Pub. No.: WO2019/179768
PCT Pub. Date: Sep. 26, 2019

(65) Prior Publication Data
US 2021/0171141 A1 Jun. 10, 2021

(30) Foreign Application Priority Data
Mar. 20, 2018 (DE) .................... 10 2018 106 458.6

(51) Int. Cl.
*B62D 65/18* (2006.01)
*B65G 1/04* (2006.01)
(Continued)

(52) U.S. Cl.
CPC .......... *B62D 65/18* (2013.01); *B65G 1/0492* (2013.01); *B65G 65/00* (2013.01); *B66F 9/0755* (2013.01);
(Continued)

(58) Field of Classification Search
CPC ...... B62D 65/18; B65G 1/0492; B65G 65/00; B65G 2203/0283; B65G 2203/044;
(Continued)

(56) References Cited

U.S. PATENT DOCUMENTS

| 4,678,390 | A | * | 7/1987 | Bonneton | ............ | B65G 1/1375 414/416.03 |
| 2015/0210472 | A1 | * | 7/2015 | Nakamura | ........... | B65G 1/0435 414/661 |

(Continued)

FOREIGN PATENT DOCUMENTS

| CN | 104875177 A | 9/2015 |
| DE | 3017456 A1 | 11/1981 |

(Continued)

OTHER PUBLICATIONS

International Search Report (ISR) in PCT/EP2019/055587, ISR dated May 27, 2019 (3 pages).

*Primary Examiner* — Glenn F Myers
(74) *Attorney, Agent, or Firm* — Fresh IP PLC; Terrence L. B. Brown

(57) ABSTRACT

Production system for series production of in particular motor vehicles, includes a container storage area storing containers containing components for production, production shelves, remote from container storage area, from which workers remove components from containers. Transport for transporting containers from container storage area to production shelves. Transport has automated guided vehicle (AGV) on which transport shelf is situated and designed so containers are automatically delivered from transport shelf to production shelves in a conveying direction (delivery direction). Handling device situated on AGV, has a base body and a handling unit situated on base body. Handling unit removes containers from transport shelf in conveying direction and delivering containers to production shelf.

(Continued)

Figure 1:
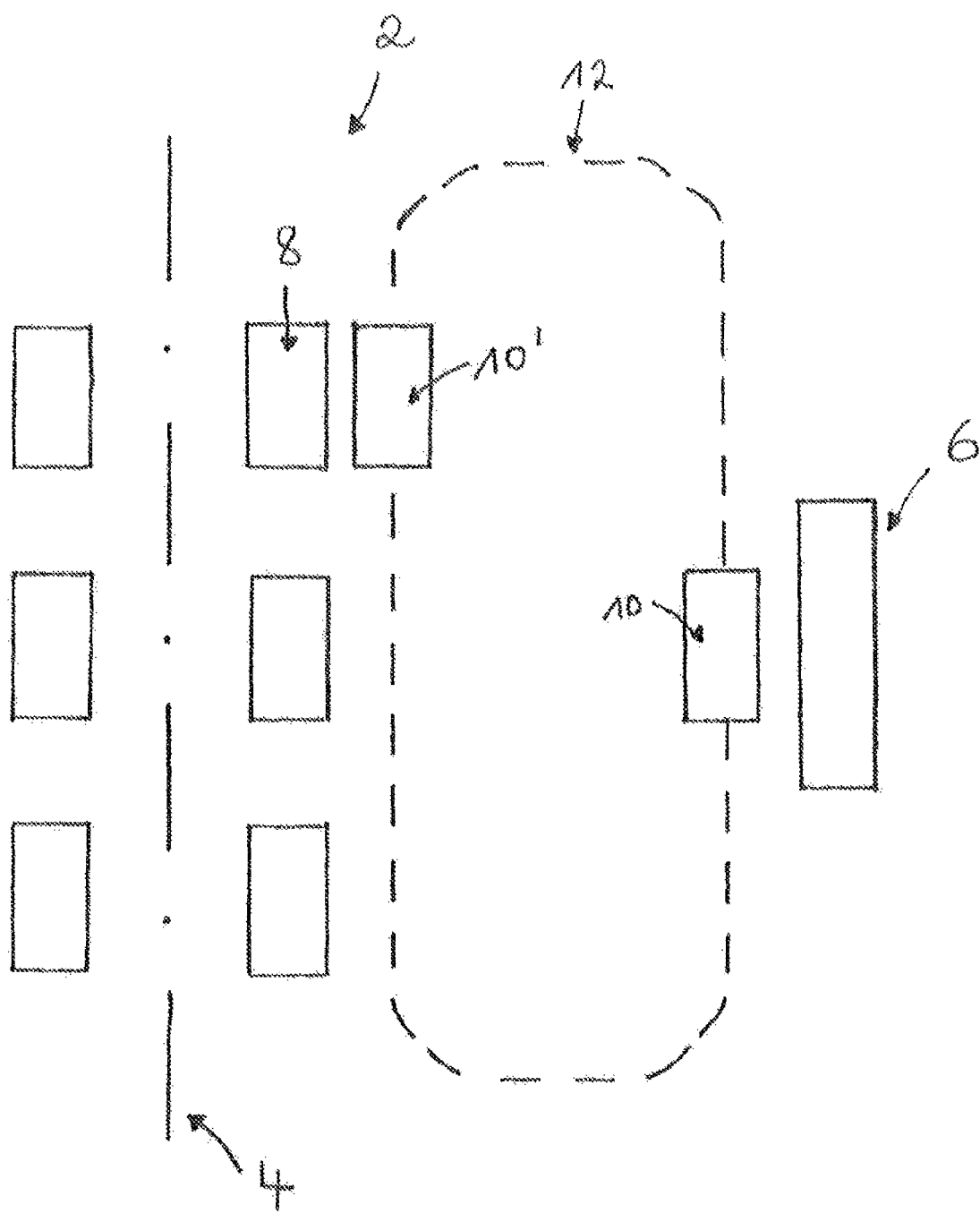

Relative to base body, handling unit is linearly adjustable along first linear adjustment axis in conveying direction, along a second linear adjustment axis transverse to conveying direction, height-adjustable along a third adjustment axis, and rotatable about vertical fourth adjustment axis.

11 Claims, 21 Drawing Sheets

(51) Int. Cl.
    *B65G 65/00*     (2006.01)
    *B66F 9/075*     (2006.01)
    *B66F 9/19*     (2006.01)

(52) U.S. Cl.
    CPC ........ *B66F 9/19* (2013.01); *B65G 2203/0283* (2013.01); *B65G 2203/044* (2013.01)

(58) Field of Classification Search
    CPC ..... B65G 2203/041; B66F 9/19; E04H 6/185; E04H 6/187; E04H 6/287; B25J 15/0014
    USPC ....... 414/241, 254, 257, 222.11, 222.12, 234
    See application file for complete search history.

(56) References Cited

U.S. PATENT DOCUMENTS

| | | | |
|---|---|---|---|
| 2018/0065806 A1* | 3/2018 | Sugahara | B25J 9/023 |
| 2018/0086489 A1* | 3/2018 | Rogers | B25J 9/042 |
| 2021/0147147 A1* | 5/2021 | Durai | B25J 9/1679 |

FOREIGN PATENT DOCUMENTS

| | | |
|---|---|---|
| DE | 202007000874 U1 | 3/2008 |
| EP | 0302205 A2 | 2/1989 |
| EP | 2745982 A2 | 6/2014 |
| GB | 2080265 A | 2/1982 |
| JP | 3-106707 A | 5/1991 |

* cited by examiner

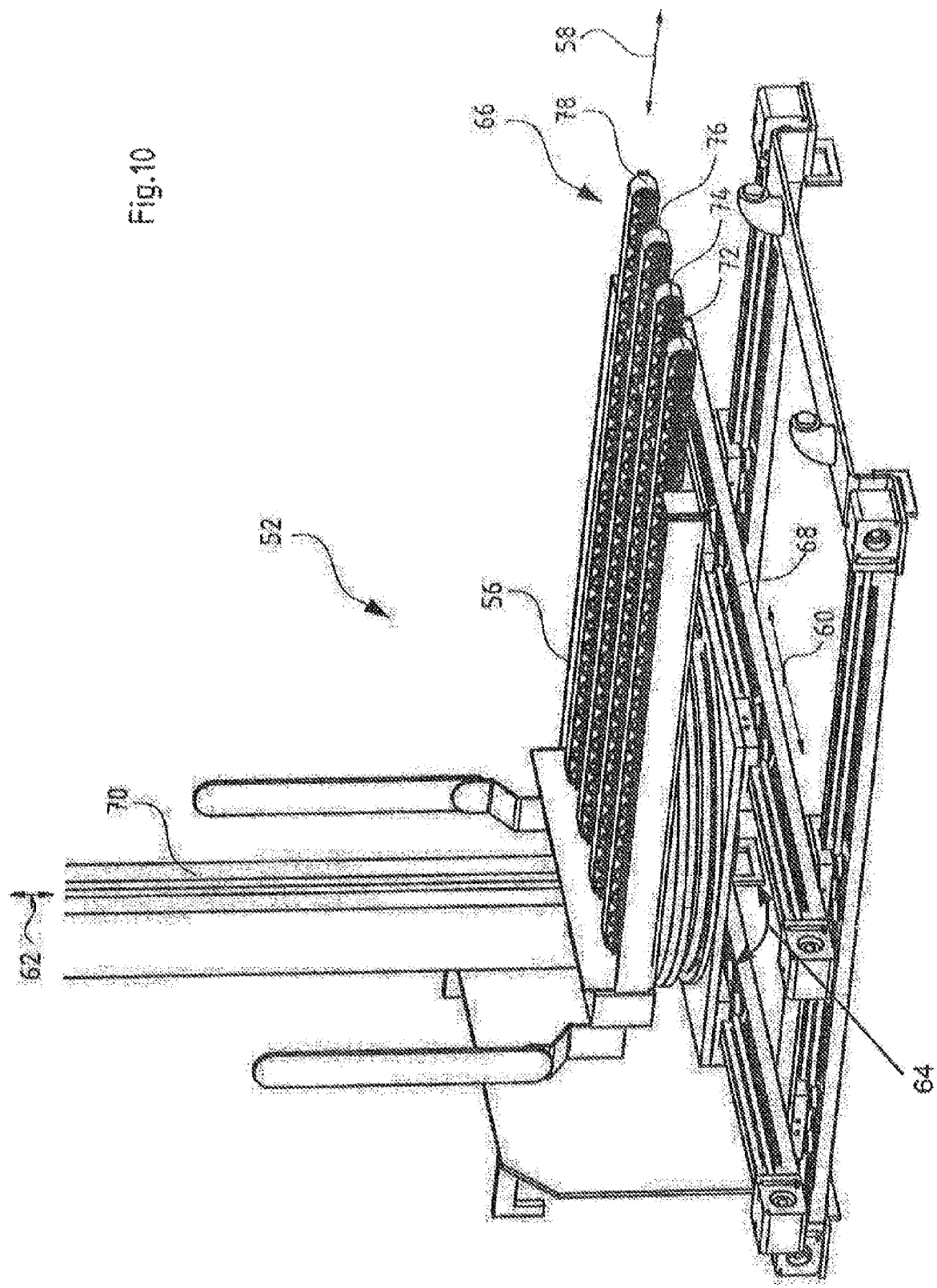

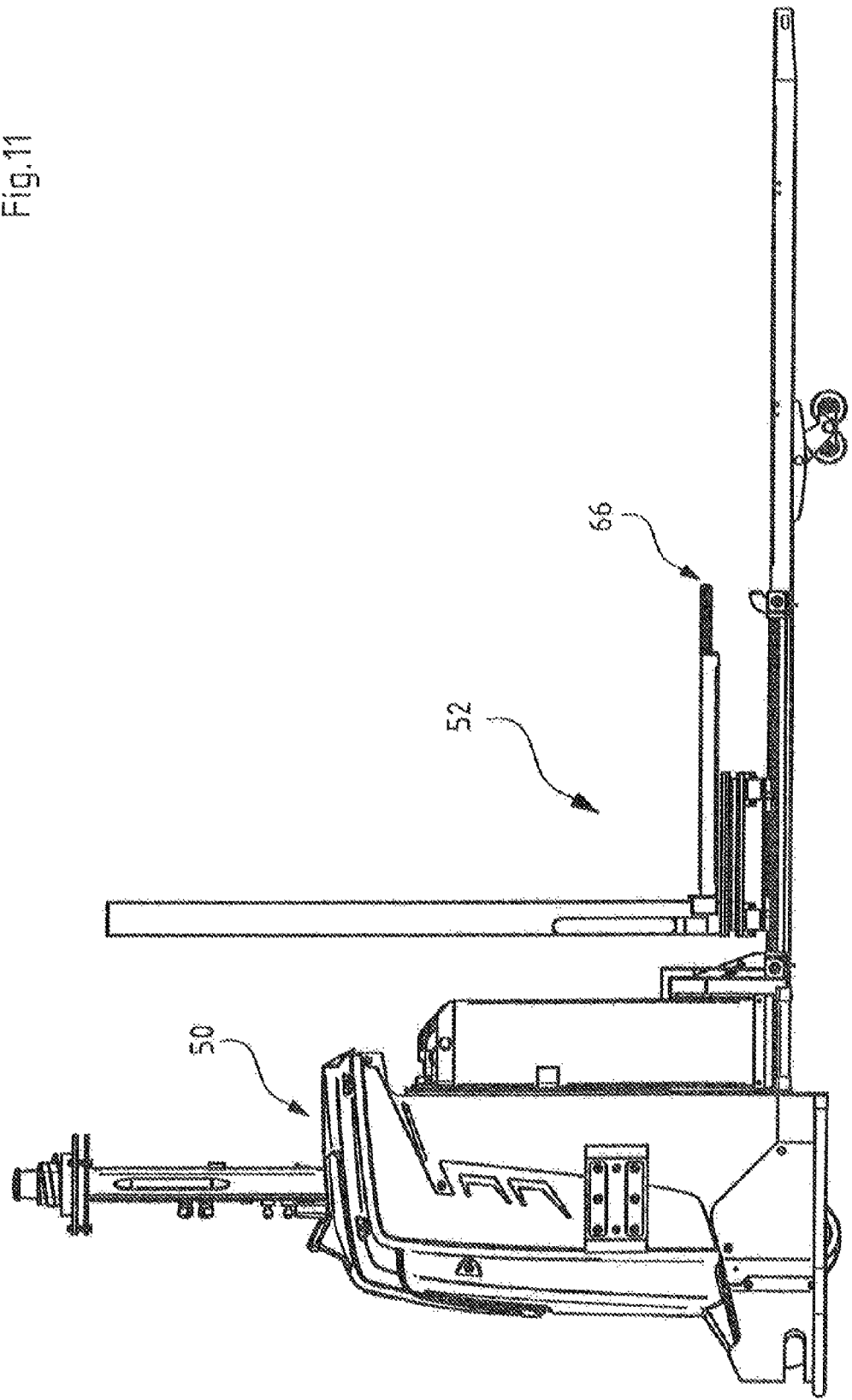

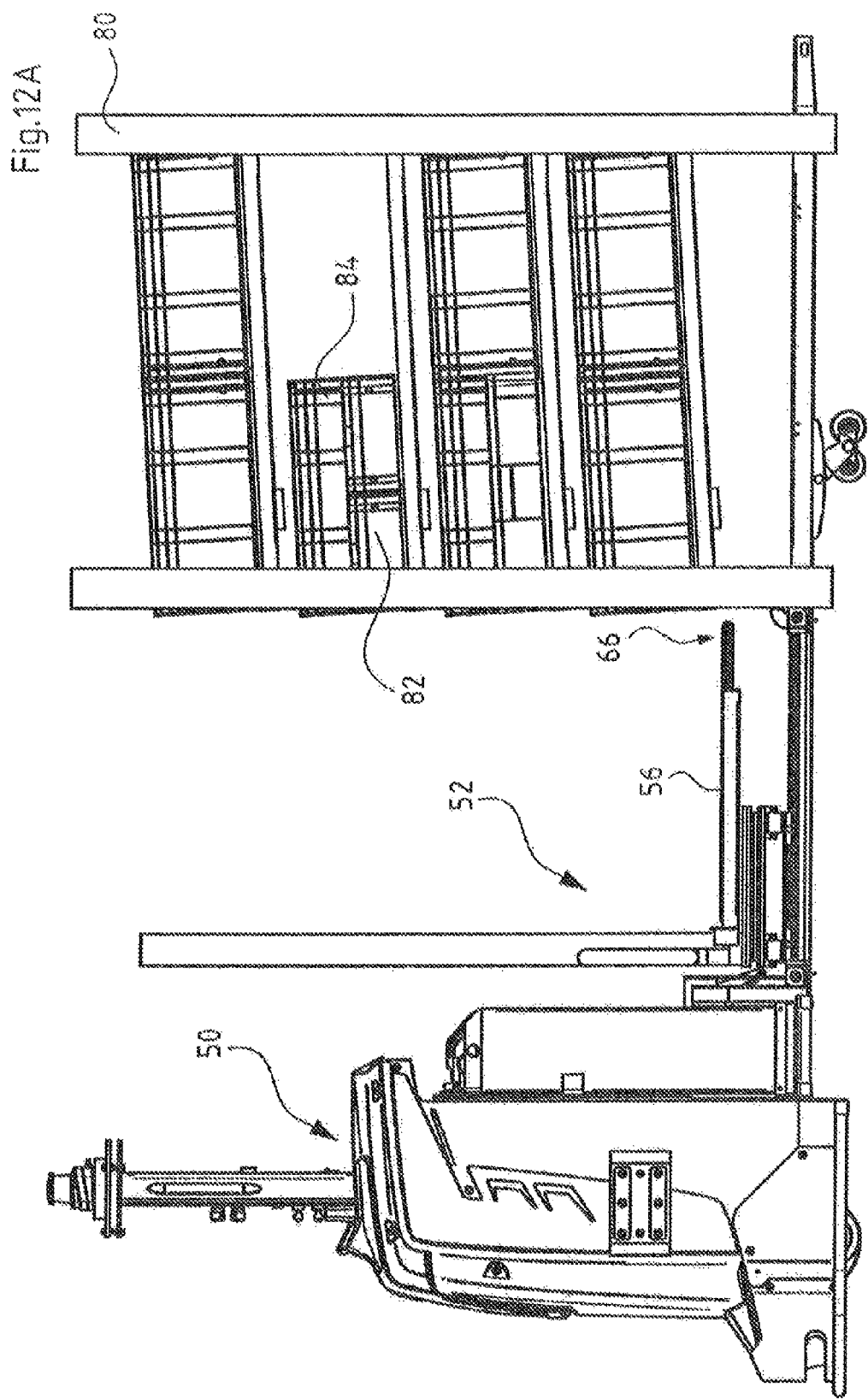

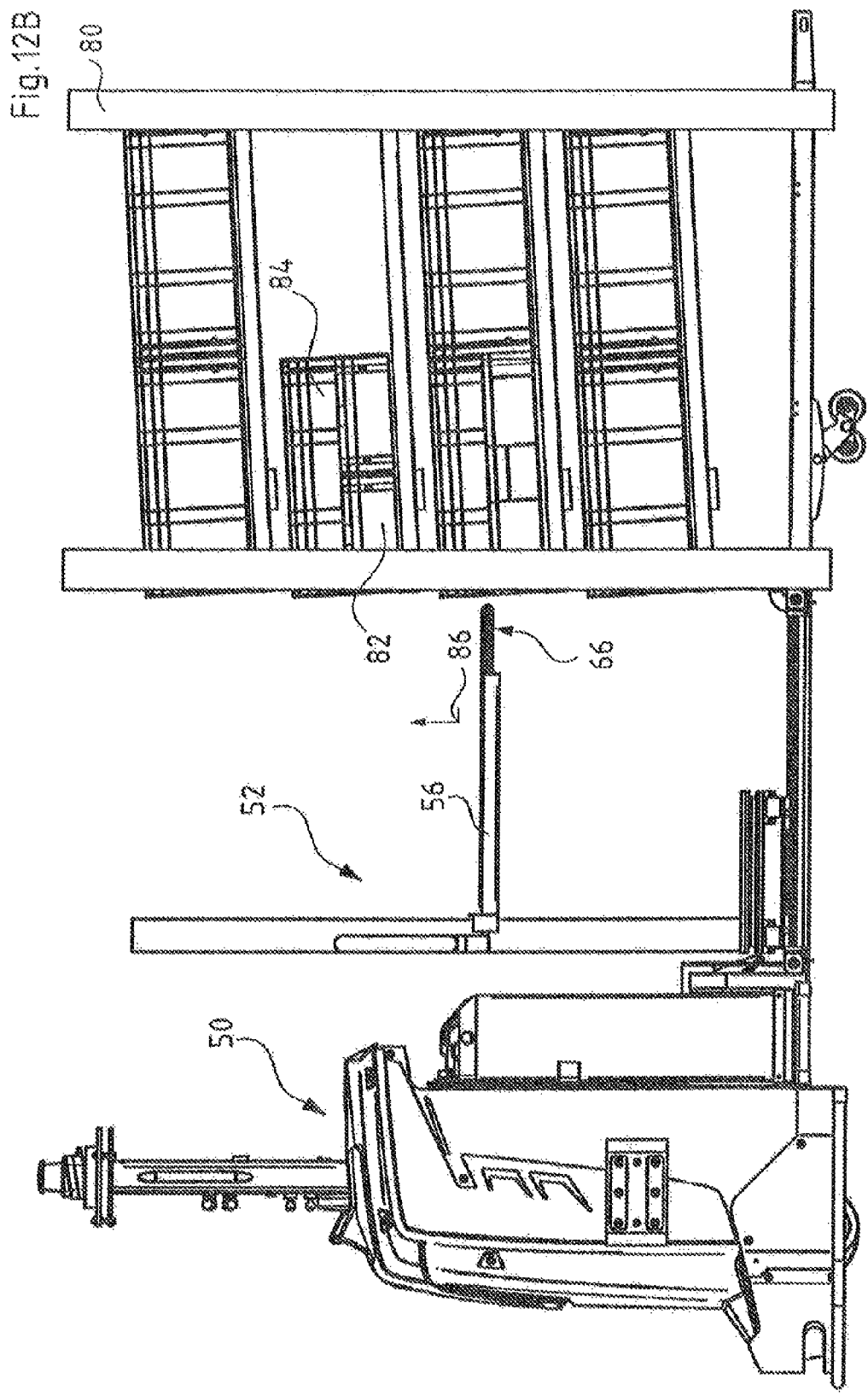

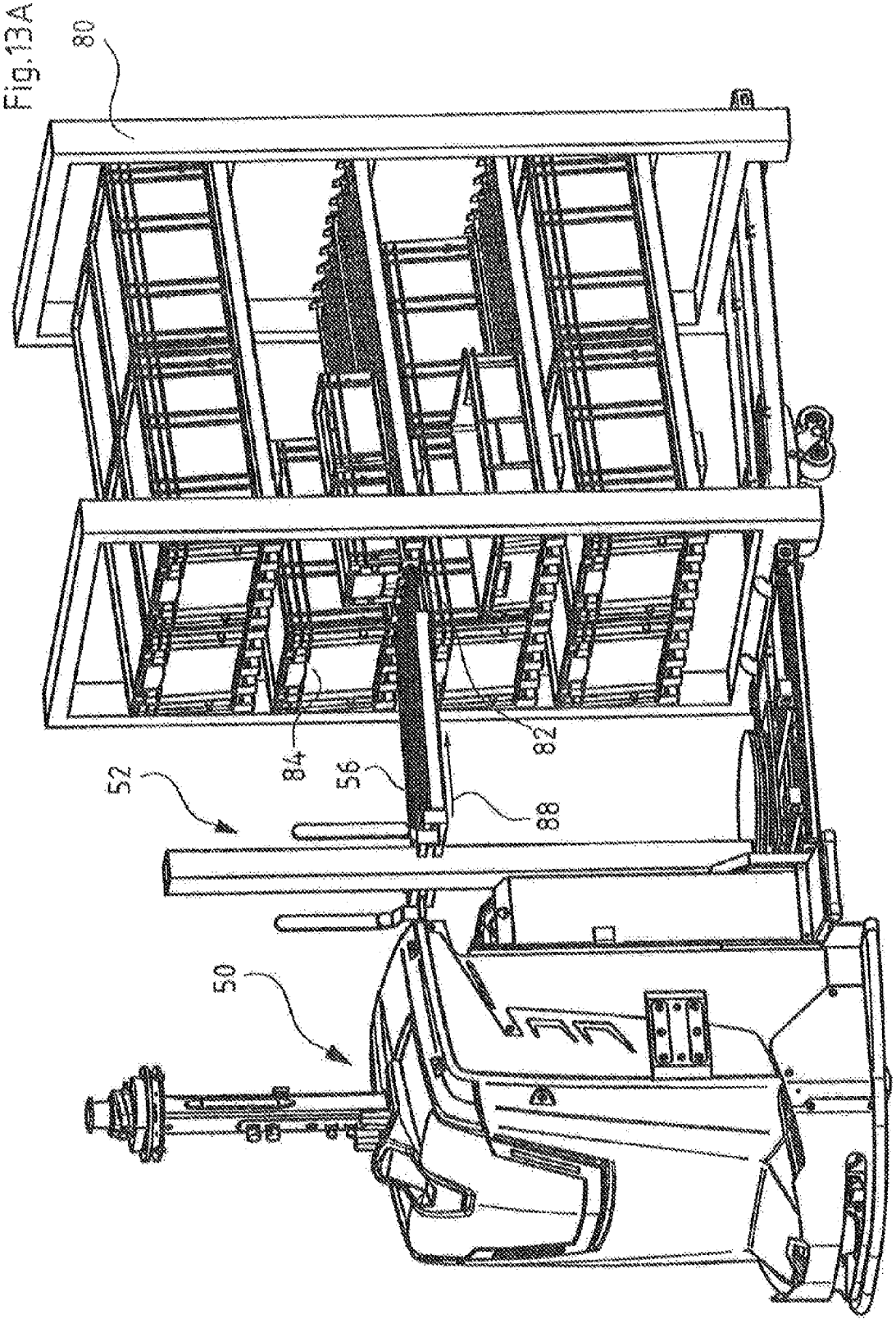

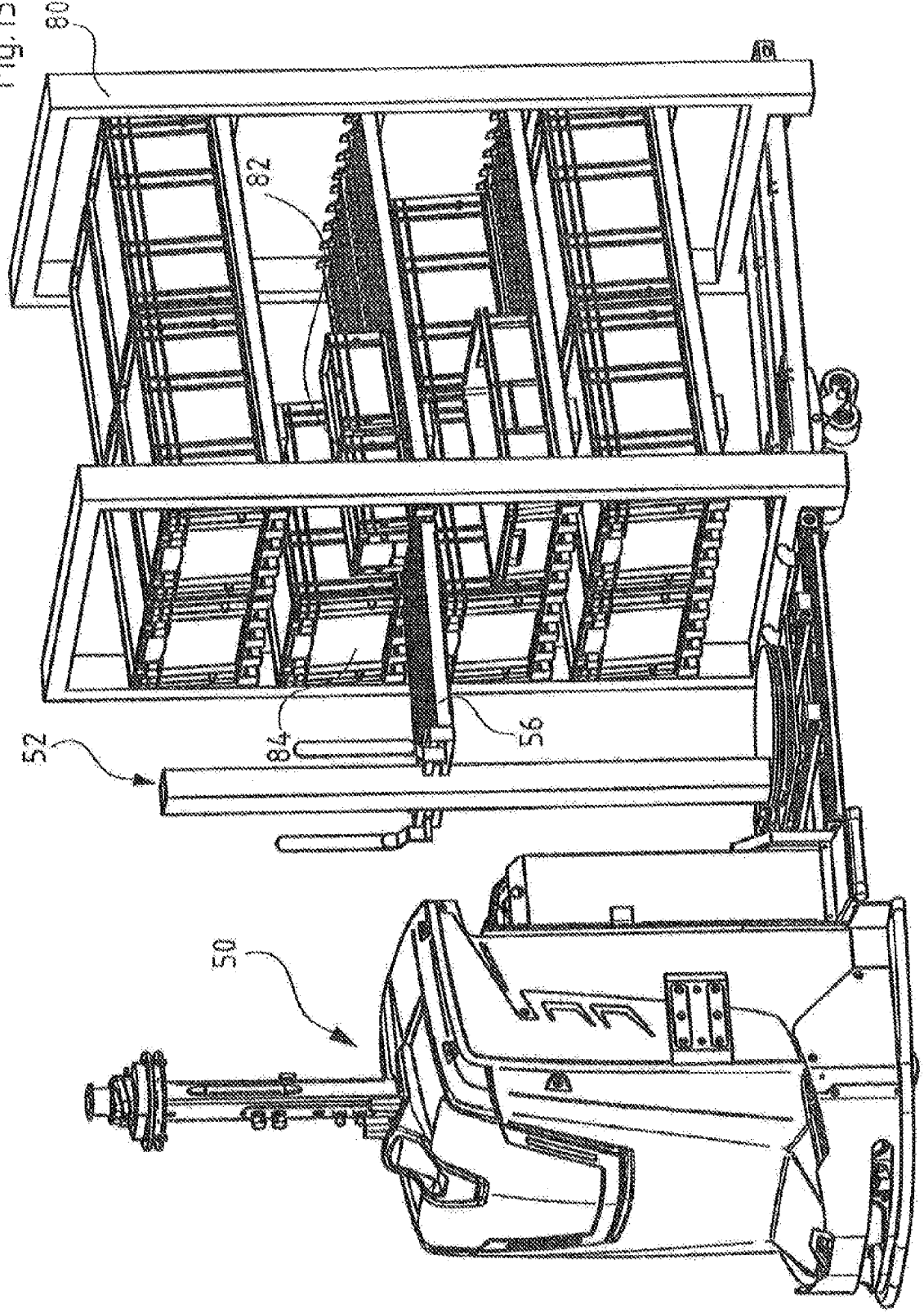

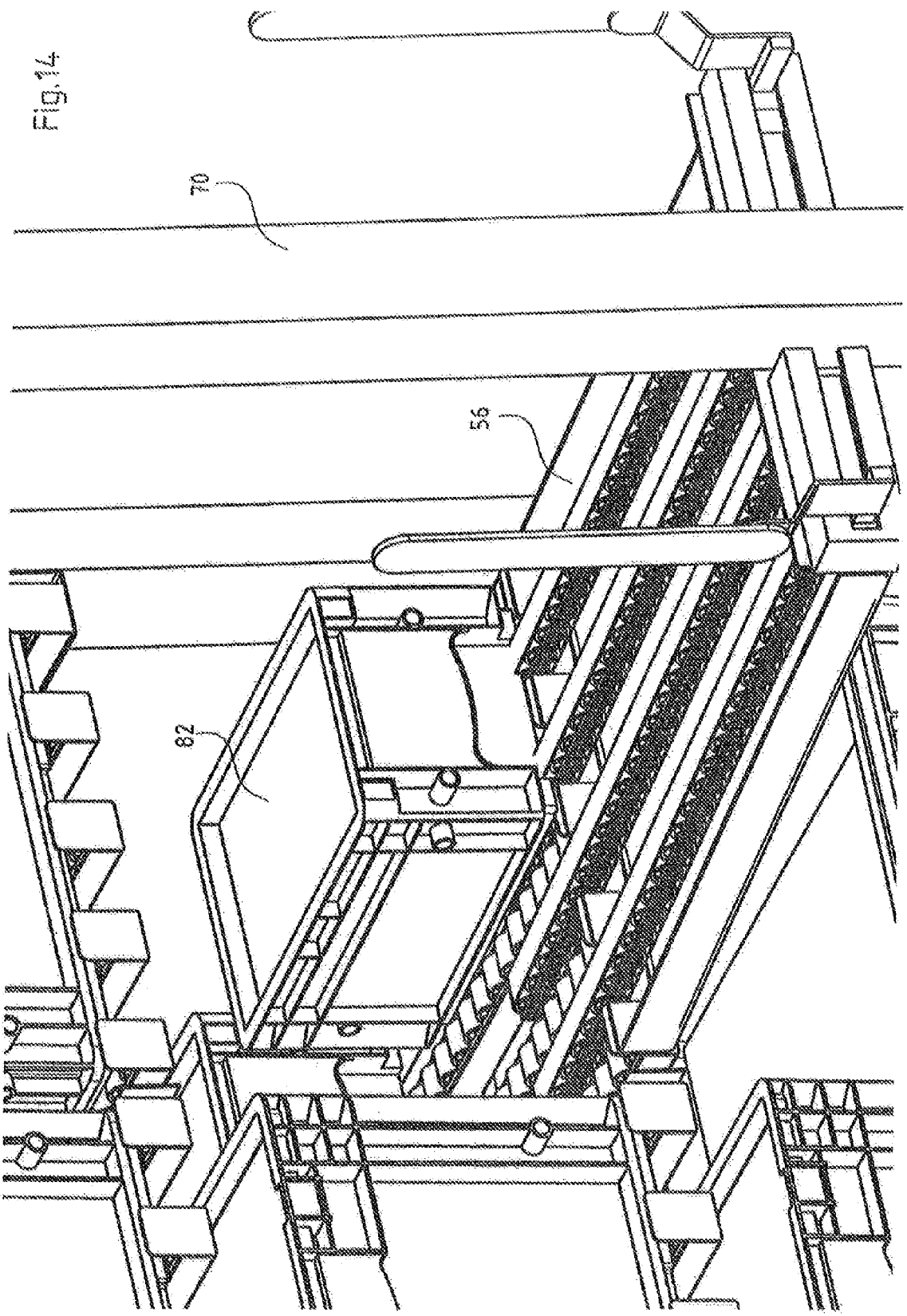

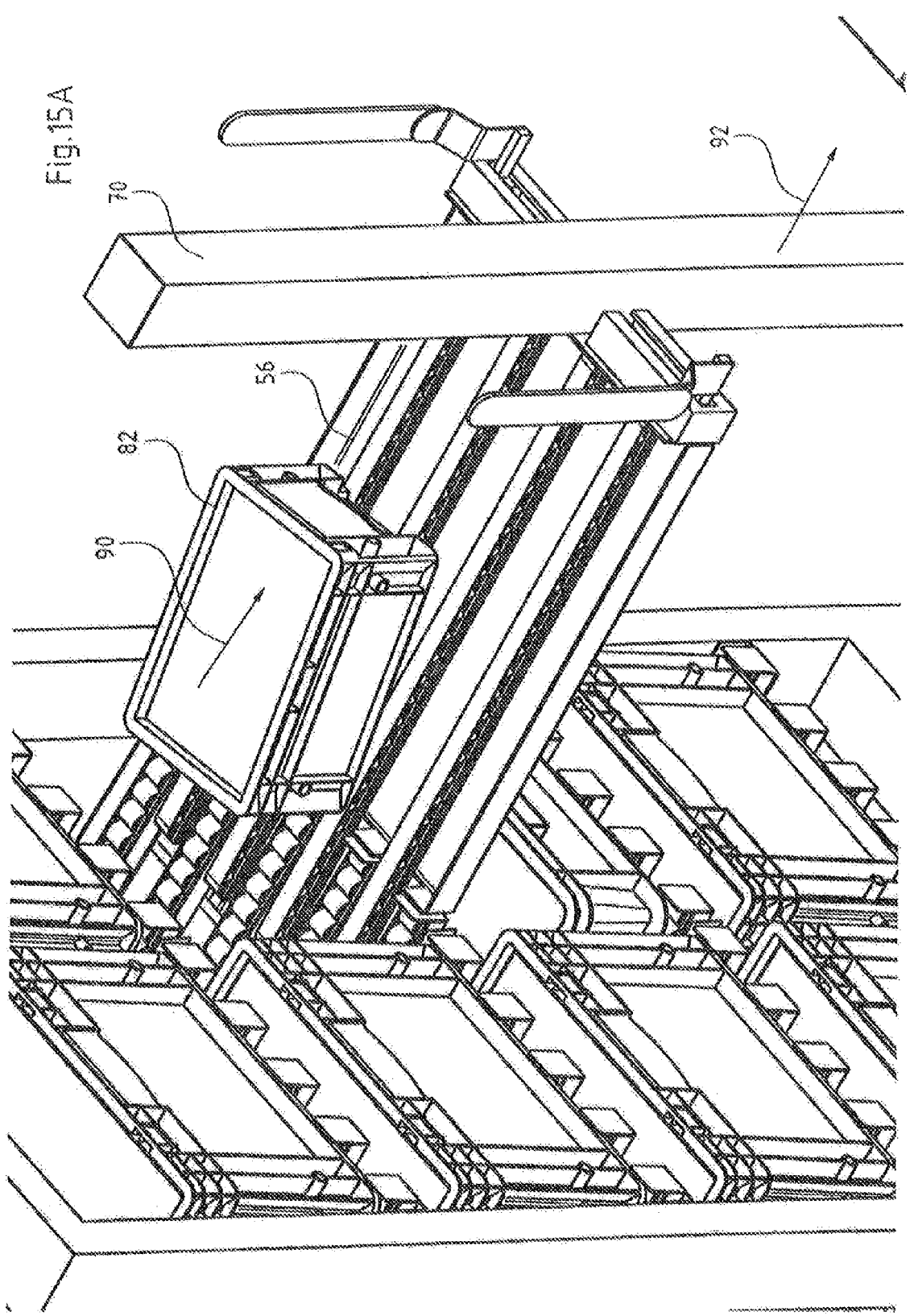

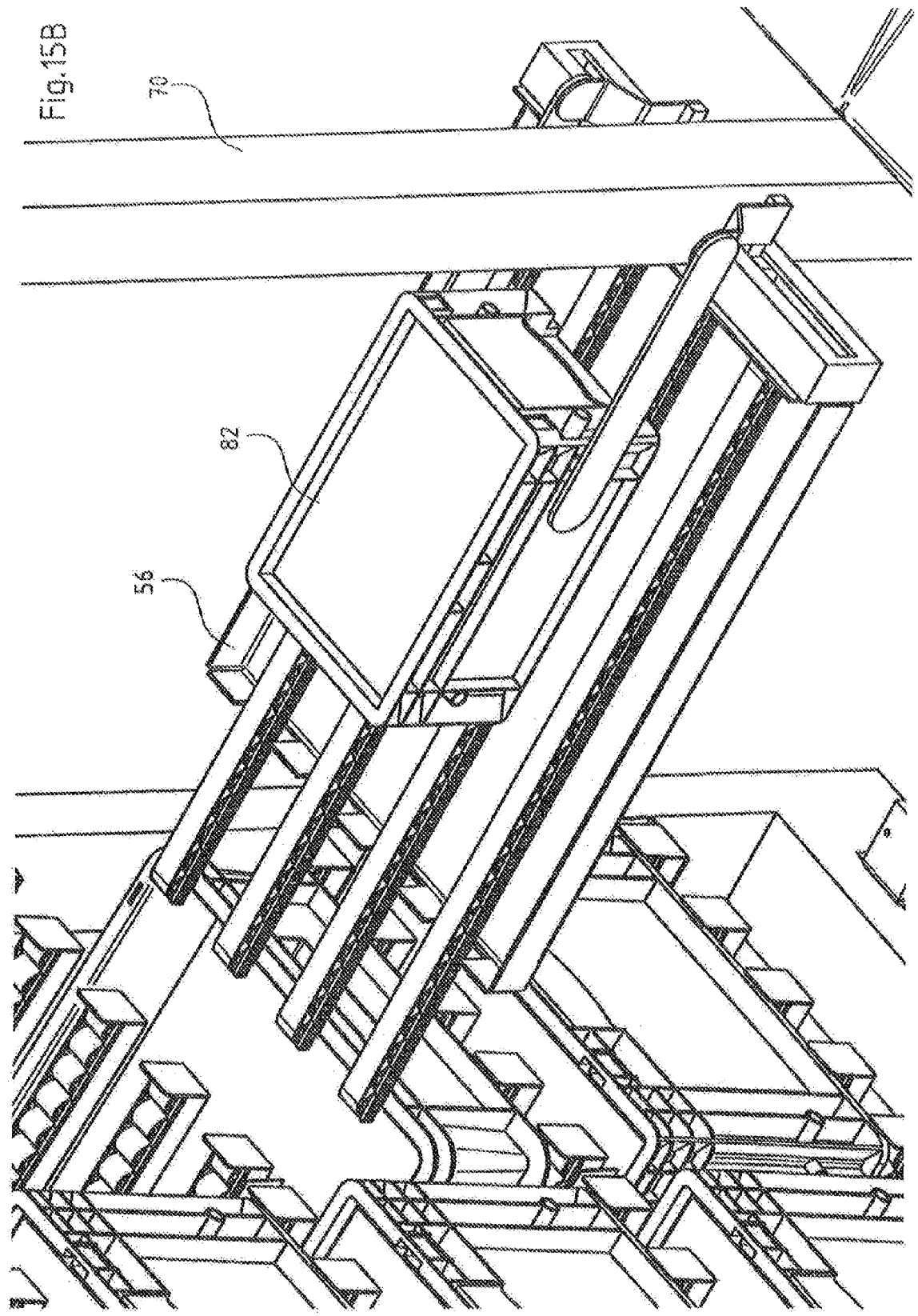

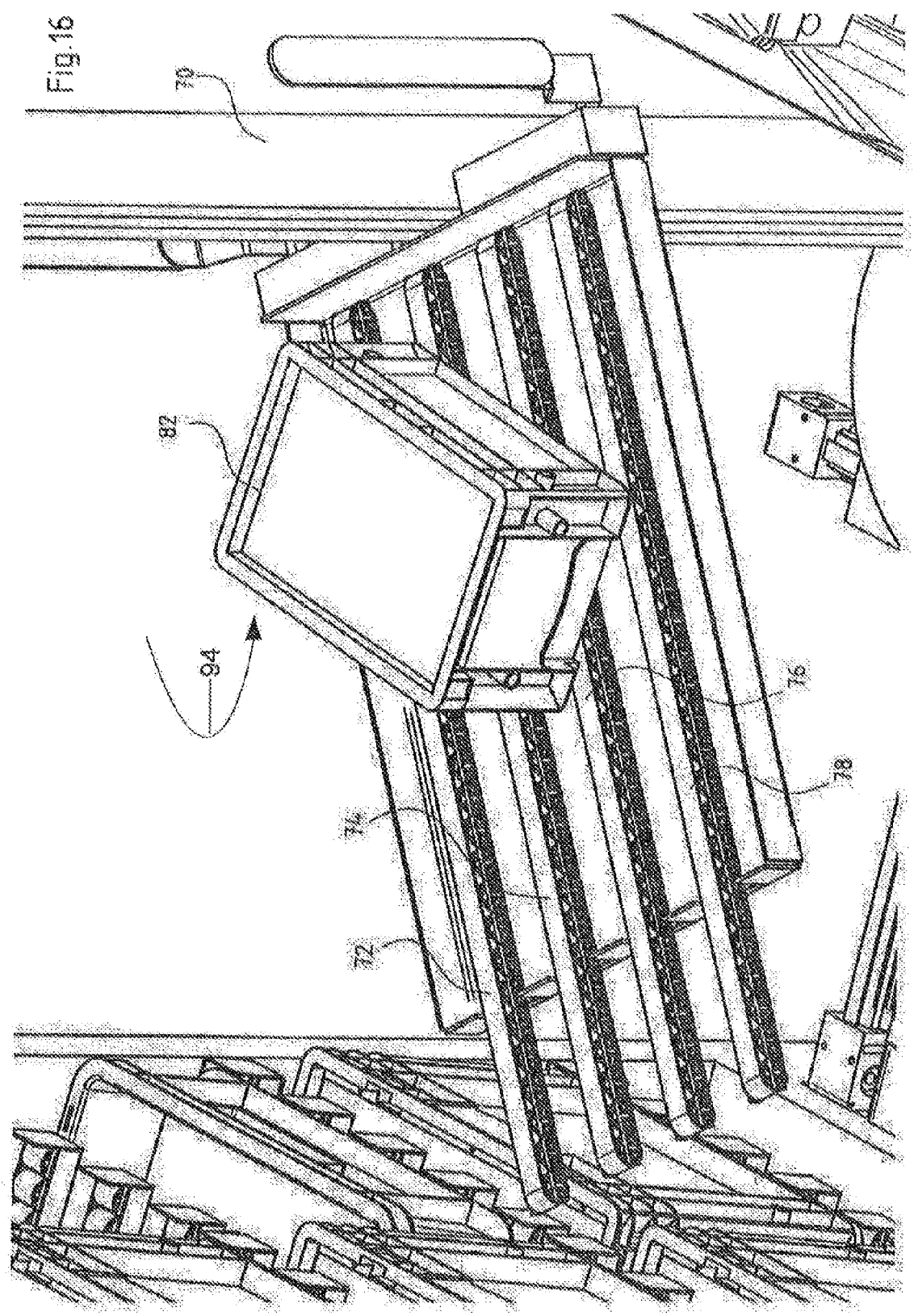

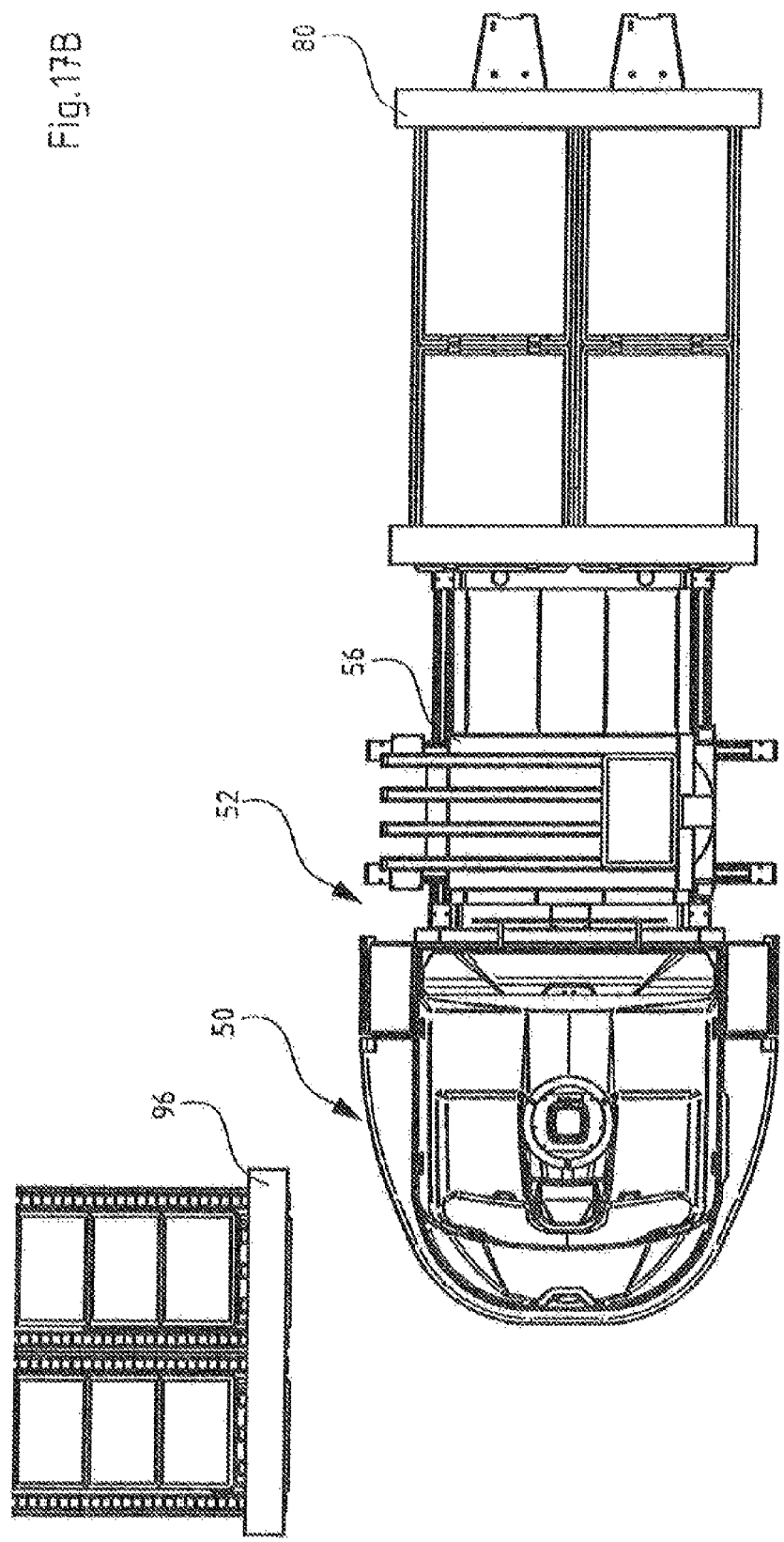

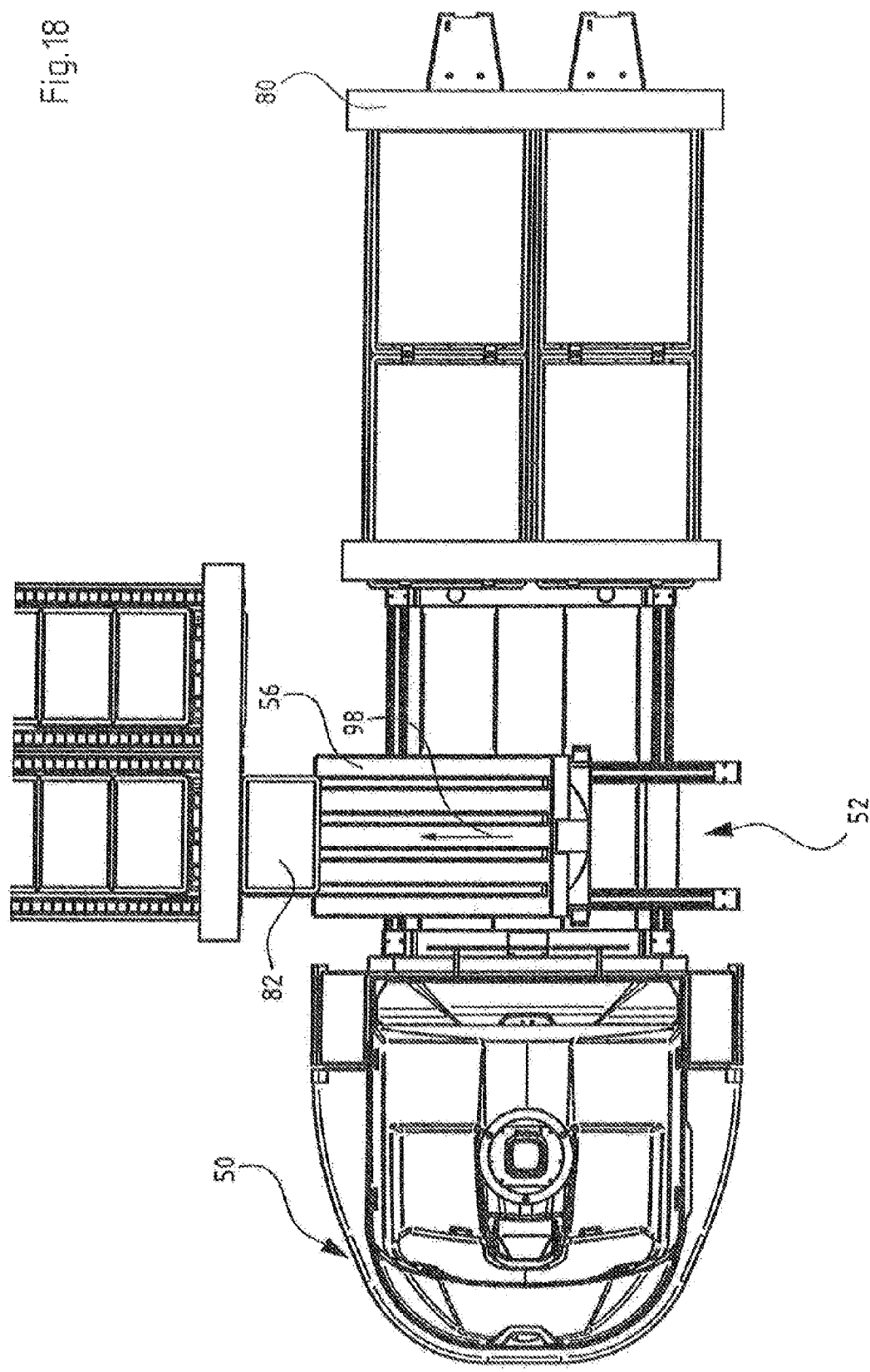

PRODUCTION SYSTEM

The invention relates to a production system for the series production of in particular motor vehicles.

The components used in the series production of motor vehicles are often classified into A, B, and C parts, the C parts being bulk material with no particular value. In particular C parts, which may be, for example, screws, nuts, or the like, are provided in material containers, also referred to below as containers for short. The containers generally each contain a large number of similar components.

The known production systems have a container storage area for storing the containers, which contain components intended for the production. In addition, the known production systems have production shelves, remote from the container storage area, from which containers may be removed by workers. The production shelves often have operating paths designed as an inclined plane, wherein a plurality of containers is situated in succession on an operating path, and material containers that are situated on the same operating path contain the same components. During the manufacturing process, initially the components are withdrawn from a material container in the front in the flow direction. When this material container is completely emptied, it may be removed from the operating path, so that material containers behind it slide down. Alternatively, it is also possible for a worker to remove a material container that is still full from the operating path, so that once again containers behind it may slide down.

Material demand planning takes place on a central apparatus or optionally multiple central apparatuses. One method for reporting material inventories to the individual production shelves, for example, is to assign a card for material demand planning to each production shelf. At regular intervals a worker or logistician checks the individual production shelves for whether sufficient material is still available. If this is not the case, the worker or logistician removes the card, which is then brought to a central apparatus at which the material demand planning takes place. Within the scope of the material demand planning, a supplementary delivery of the appropriate material may then take place at the particular location.

To facilitate the reporting of material inventories to the central apparatus, it is known to use a so-called call button. Thus, when necessary, for example when the next to last material container is removed from an operating path, a worker actuates the call button so that a material request is initiated at the central apparatus, after which the depleted material may be delivered to the particular production shelf. The reporting of a material demand to the central apparatus is thus automated by means of the call button.

To further automate the demand planning, it is known from DE 20 2007 01 2926 U1 to sense via a sensor means whether a container is present at a predetermined location on the production shelf. For example and in particular, the sensor means may sense the position of at least one material container on the operating path of a production shelf. The particular sensor means may be connected via radio, for example, to a central apparatus, and may thus automatically report a corresponding material demand to the central apparatus. In this way, the request for material containers may be automated, so that it has a particularly reliable design. Since the request for material containers no longer has to be made by the workers, their workload is relieved.

The known production systems also have a transport means for transporting containers from the container storage area to the production shelves. The transport usually takes place in such a way that a transport vehicle is loaded with filled containers at a picking station, which is also referred to as a "depot" or a "supermarket." After the loading, a driver drives the transport vehicle to the particular location where there is a material demand and at which a material container carried on the transport vehicle is to be inserted into the production shelf. The insertion of the material container into the production shelf is carried out by the logistician, who at the same time carries along the provided empty container to the production shelves. After all containers are delivered, the logistician drives the transport vehicle back to the picking station, so that the transport vehicle may once again be loaded with filled material containers and the operation may be repeated.

A production system for the series production of in particular motor vehicles is known from EP 2 745 982 A2, having a container storage area for storing containers that contain components intended for the production, and a plurality of production shelves, remote from the container storage area, from which components maybe removed from containers by workers. The known production system also has a transport means for transporting containers from the container storage area to the production shelf, wherein the transport means has at least one automated guided vehicle (AGV) that is designed and configured in such a way that containers are or may be automatically delivered to production shelves in a conveying direction (delivery direction).

The production system known from the cited publication achieves the entire logistical object of fully automatically transporting material from a storage area of the production system to production shelves, according to the particular need. The production system has high flexibility and efficiency with regard to its processes for transporting containers.

The object of the invention is to provide a production system whose efficiency is further improved.

This object is achieved by the invention set forth in claim 1.

The invention provides that a handling device is situated on the AGV, the handling device having a base body and a handling unit, situated on the base body, which is designed for removing containers from the transport shelf in a conveying direction and delivering containers to at least one production shelf, wherein relative to the base body the handling unit
  is linearly adjustable along a first linear adjustment axis in the conveying direction,
  is linearly adjustable along a second linear adjustment axis transverse to the conveying direction,
  is height-adjustable along a third adjustment axis, and
  is connected to the base body so as to be rotatable about an essentially vertical fourth adjustment axis.

One advantageous further embodiment of the invention provides that preferably electric motor drives that are independently controllable by a control apparatus are associated with the adjustment axes. Since the AGV has a battery anyway for feeding the drive and the drive control of the AGV with electrical energy, the use of electric motor drives is appropriate.

Another advantageous further embodiment of the invention provides that the handling unit has at least one fork-like supporting element for supporting a container to be handled.

To facilitate handling of the containers, one advantageous further embodiment of the invention provides that at least one supporting element has a conveying means for conveying a container to be handled in the conveying direction and opposite the conveying direction.

One advantageous further embodiment of the above-mentioned embodiment provides that the conveying means has at least one conveyor belt that extends in the conveying direction. Such conveyor belts are available as relatively inexpensive, robust, and energy-efficient standard assemblies.

In the above-mentioned embodiment, it is sufficient in principle if the conveying means has a single conveyor belt. However, the conveying means advantageously has at least two spaced-apart conveyor belts situated in parallel, as provided in another advantageous further embodiment.

In the above-mentioned embodiment, according to one advantageous further embodiment at least two conveyor belts are independently controllable by a control apparatus.

The control of the conveyor belts takes place according to the particular conveying task in the handling of a container. In this regard, one advantageous further embodiment provides that for conveying a container situated on the conveyor belts in the conveying direction, the control apparatus controls the conveyor belts in such a way that they run in the same direction.

Another advantageous further embodiment provides that for changing the rotational position of a container situated on the conveyor belts in the conveying direction, the control apparatus controls at least two conveyor belts in such a way that they run in opposite directions. In this embodiment, by appropriately controlling the conveyor belts it is possible to change the rotational position of a container in any desired manner if this is necessary for operation of the production process with regard to the handling of containers.

Another advantageous further embodiment of the invention provides a sensor means for determining the position of the handling unit relative to a shelf, in particular a production shelf, the sensor means being in data transmission connection with the control apparatus in such a way that the control apparatus controls the drives associated with the adjustment axes as a function of the position, determined by the sensor means, of the handling unit relative to the shelf in order to remove a container from the shelf or deliver a container to a shelf. The risk of malfunctions of the production system, which may occur due to misalignment of the AGV relative to a shelf while removing a container from a shelf or delivering a container to a shelf, is reduced in this way.

Any given, suitable sensor means may be used in the above-mentioned embodiment. In this regard, one advantageous further embodiment provides that the sensor means has at least one optical sensor. For example, cameras, which are available as relatively inexpensive standard components, may be used as optical sensors.

According to another advantageous further embodiment, the supporting element is designed in such a way that it is movable beneath the base of a container in order to handle the container that is accommodated in a shelf.

The invention is explained in greater detail below with reference to the appended drawings, in which one embodiment of a production system according to the invention is schematically illustrated, sometimes in the form of a sketch. All features that are described, illustrated in the drawings, and claimed in the patent claims, alone or in any arbitrary combination, constitute the subject matter of the invention, regardless of their recapitulation in the claims or their back-reference, and regardless of their description or illustration in the drawings.

Figure 2:
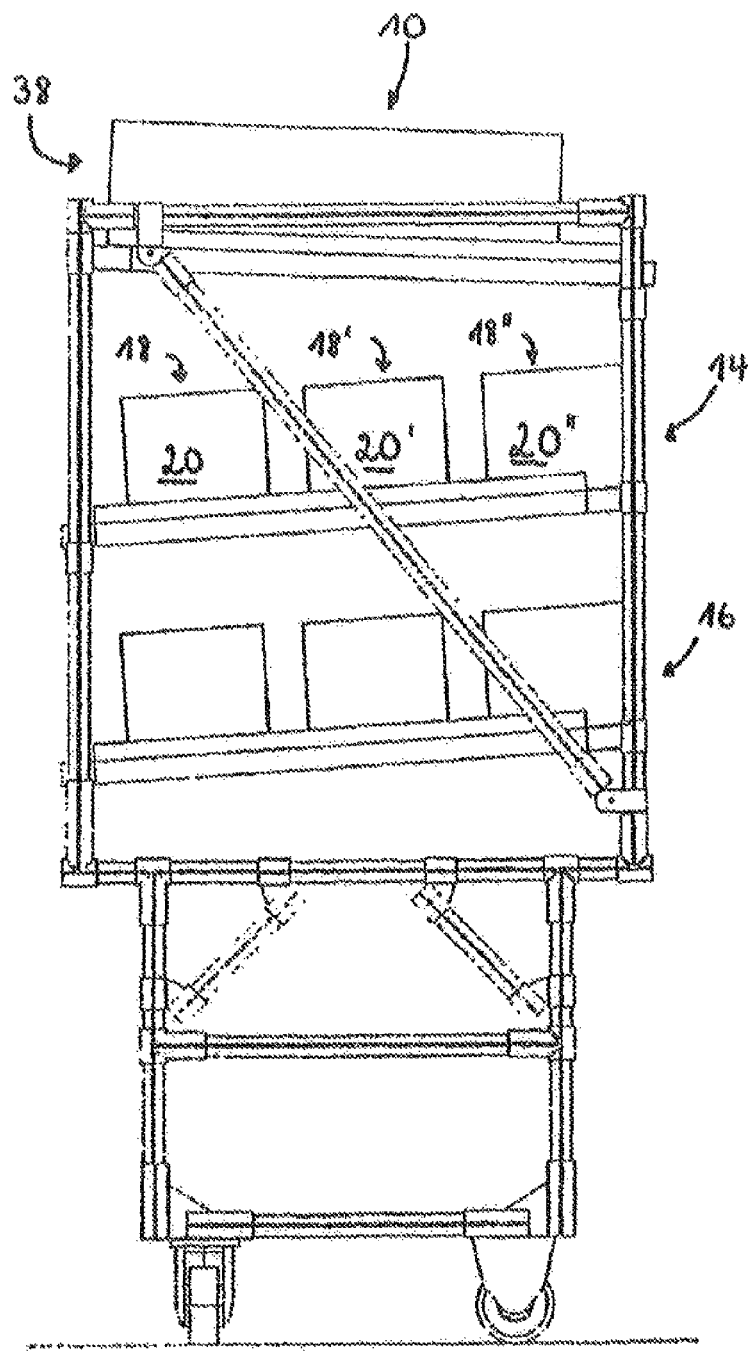
Figure 3:
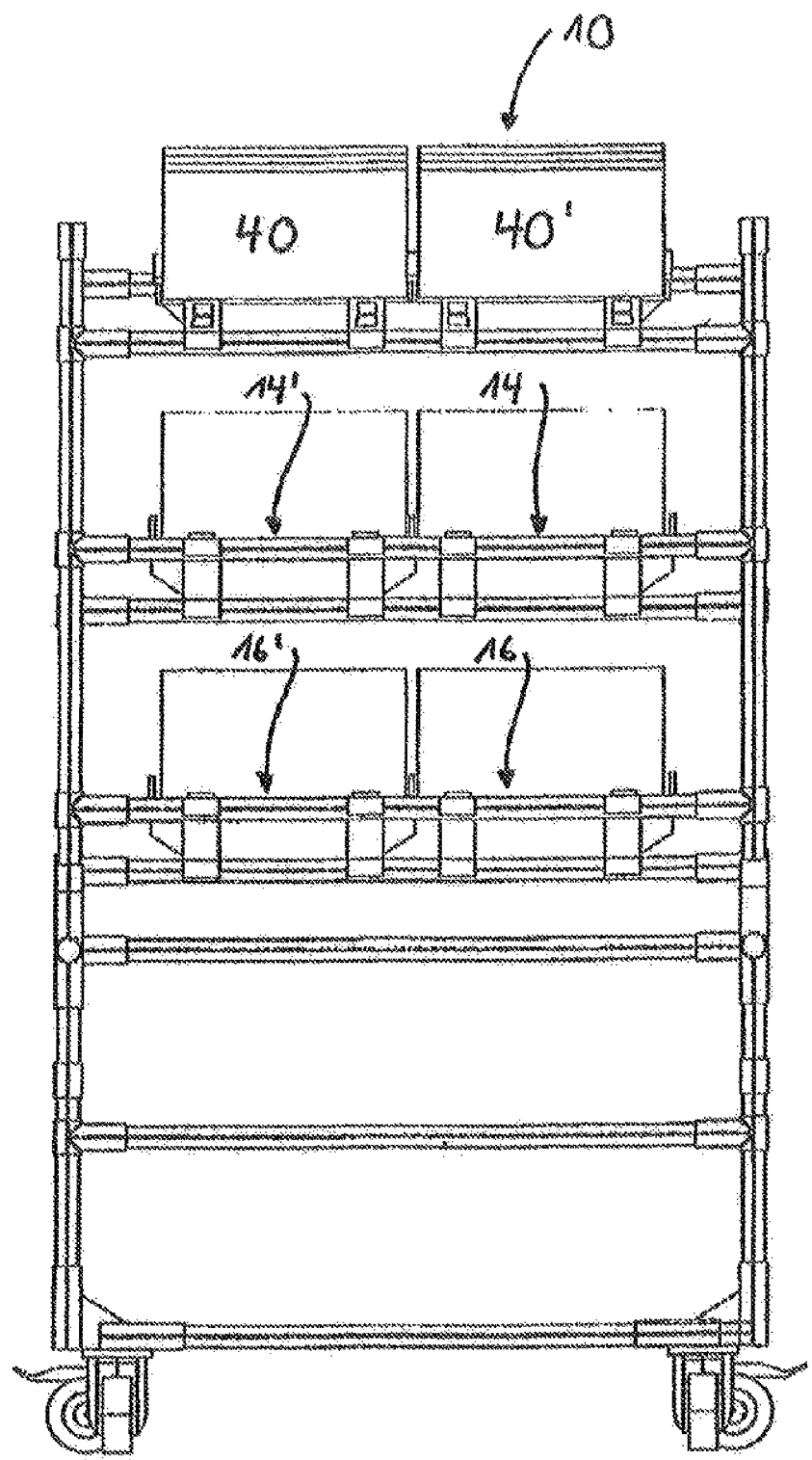
Figure 5:
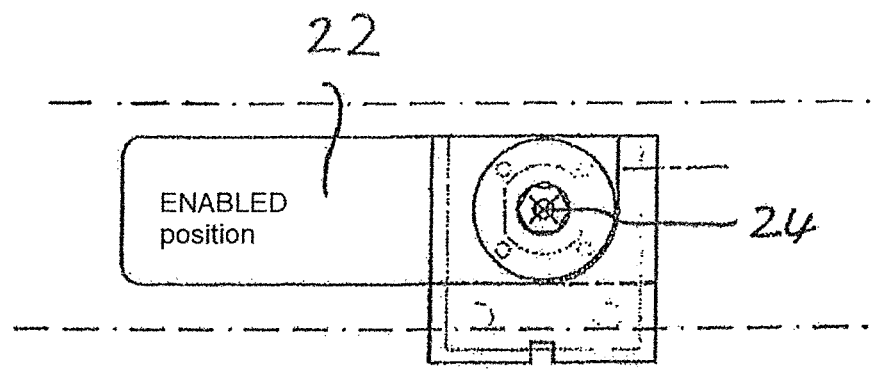
Figure 4:
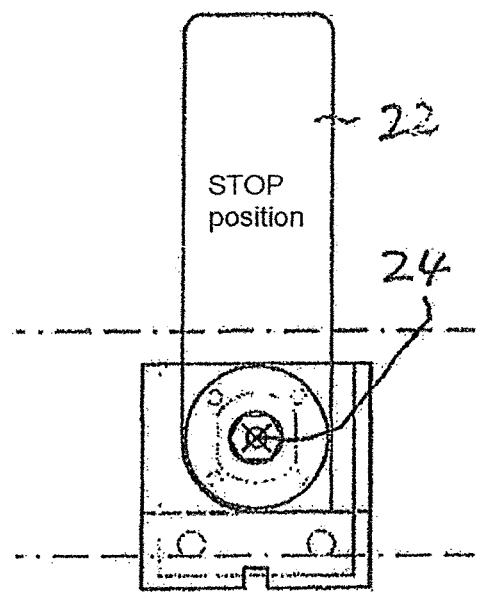
Figure 6:
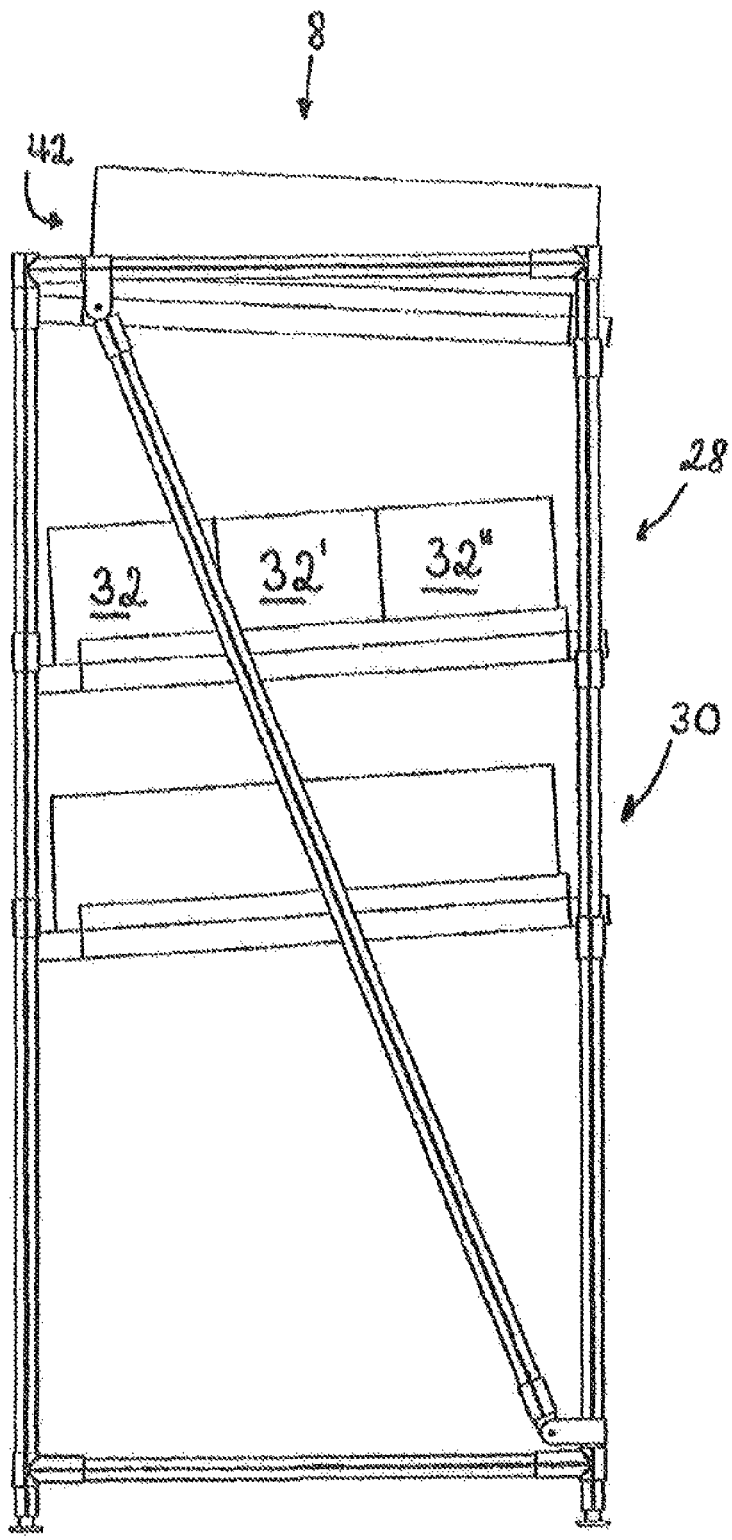
Figure 7:
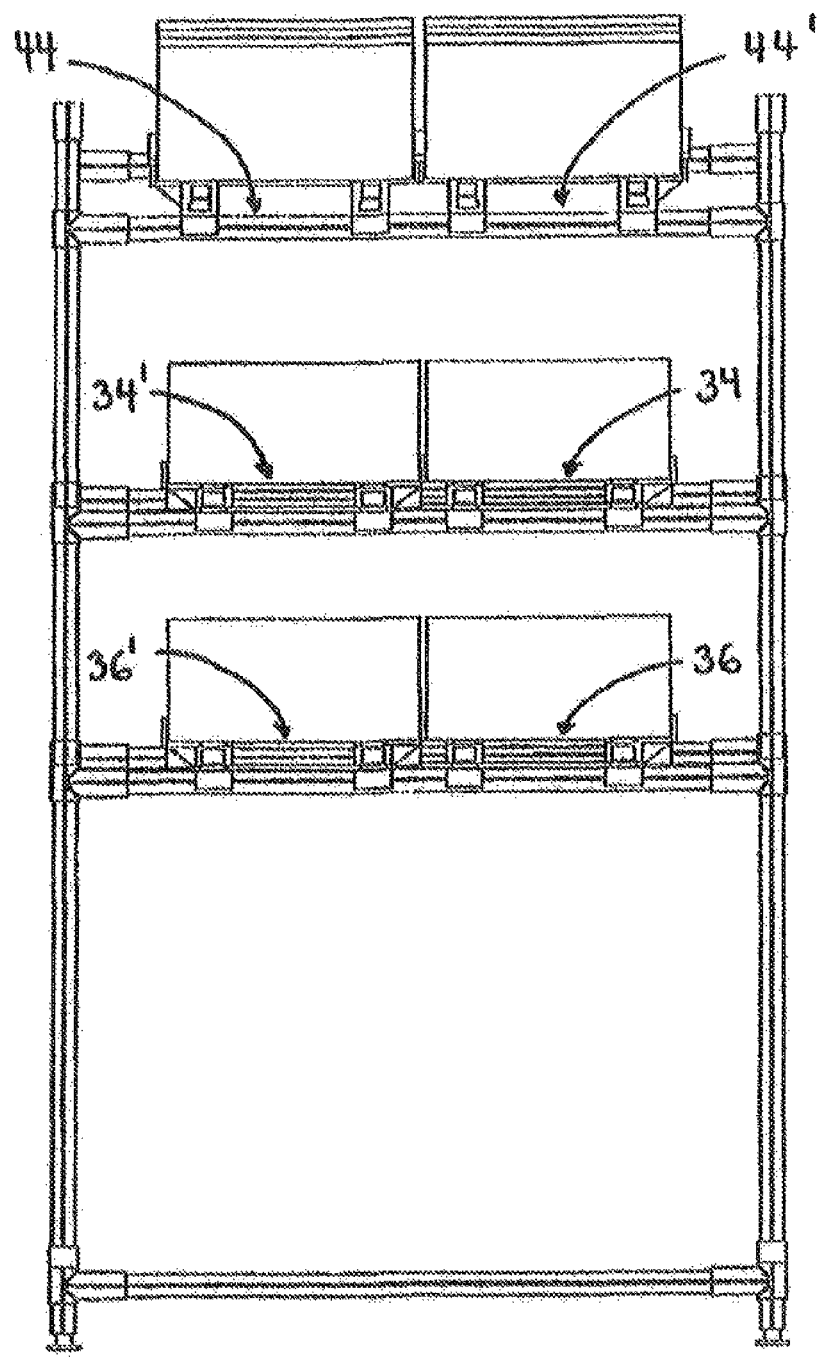
Figure 8:
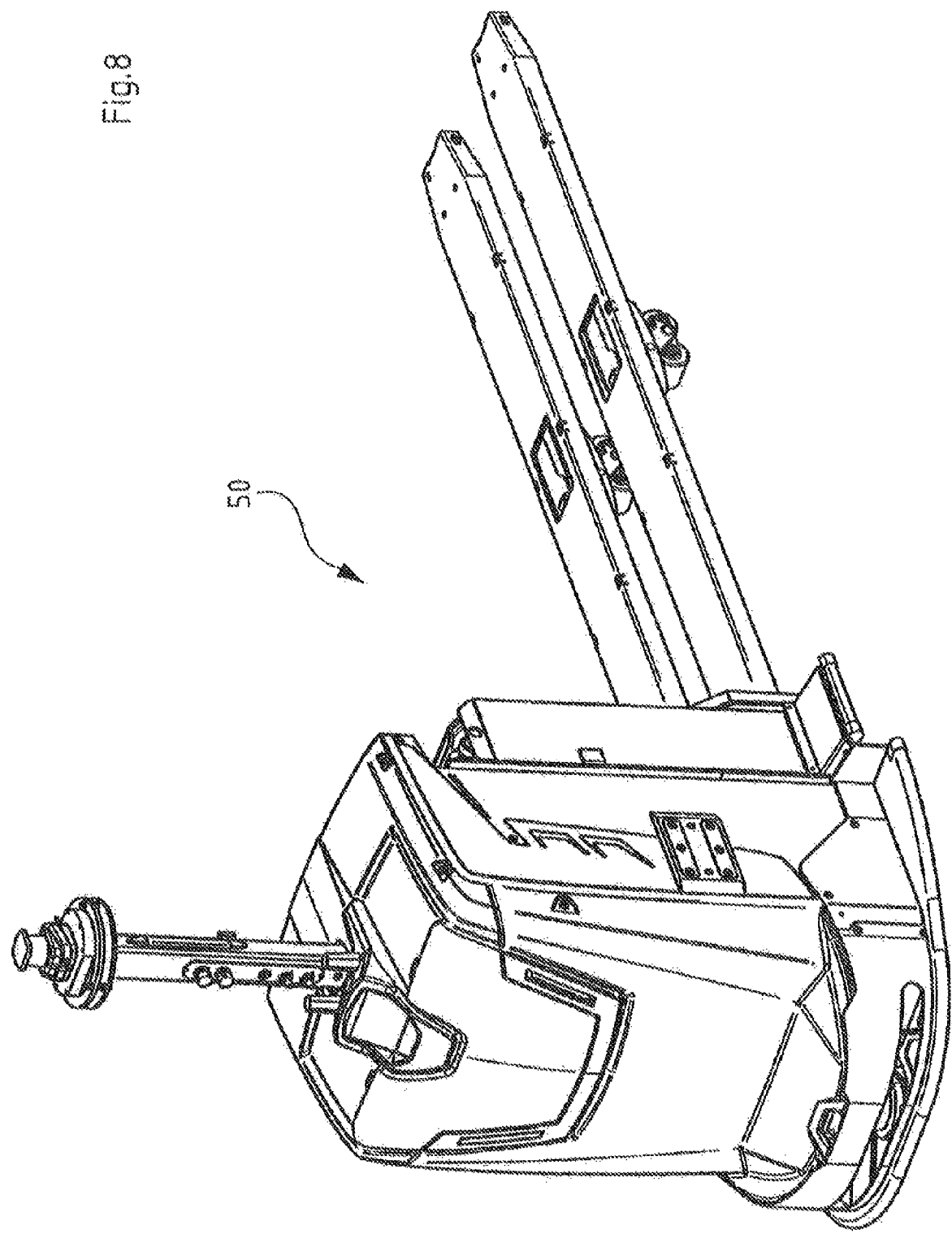
Figure 9:
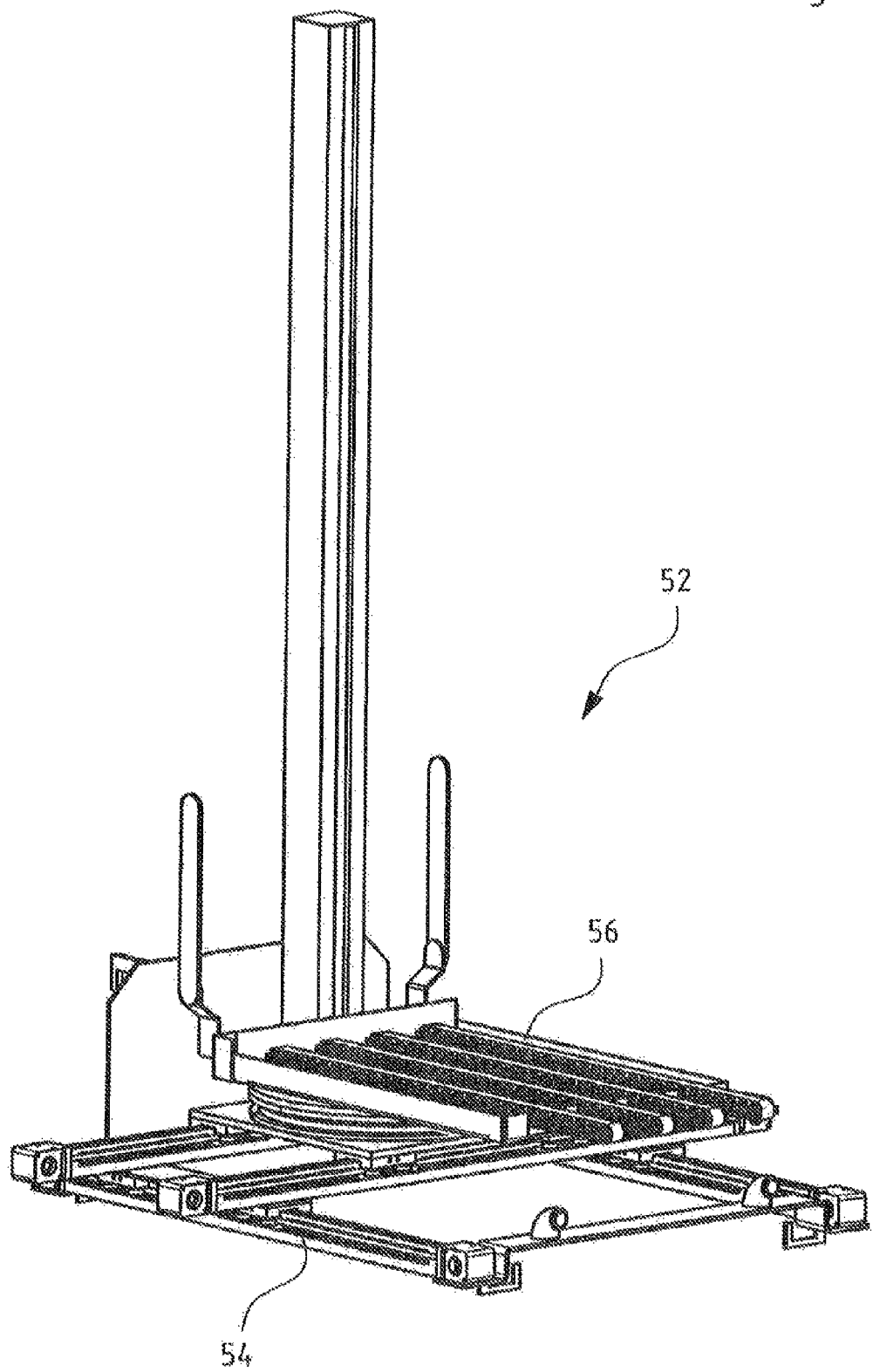

In the drawings:

FIG. 1 shows a highly schematic sketch of a topology of a production system 2 according to the invention, FIG. 2 shows a schematic view from the rear of one embodiment of an AGV according to the invention, FIG. 3 shows the AGV according to FIG. 2 in a side view, FIG. 4 shows a view from the front of a blocking element of an AGV according to the invention in its blocking position, FIG. 5 shows the blocking element in its delivery position, in an illustration similar to FIG. 4, FIG. 6 shows one embodiment of a production shelf of the production system according to FIG. 2, in the same illustration as for FIG. 2, FIG. 7 shows a side view of the production shelf according to FIG. 6, FIG. 8 shows another embodiment of an AGV according to the invention of a production system, in an illustration similar to FIG. 2, FIG. 9 shows a perspective view of a handling device according to the invention, FIG. 10 shows a portion of the handling device according to FIG. 9, in enlarged scale compared to FIG. 9, FIG. 11 shows a side view of the AGV according to FIG. 8, with a handling device according to FIG. 9 situated thereon, FIGS. 12A and 12B each show a side view of the AGV according to FIG. 8, with a handling device according to FIG. 9 situated thereon and a transport shelf situated thereon, FIGS. 13A and 13B shows a perspective view of the AGV according to FIG. 8, with a handling device according to FIG. 9 situated thereon and a transport shelf situated thereon, FIG. 14 shows a perspective view of a detail from FIG. 13, FIGS. 15A and 15B each show another perspective view of a detail from FIG. 13, FIG. 16 shows a perspective view of a detail from FIG. 15, FIGS. 17 and 17B each show a top view of the AGV according to FIG. 8, with a handling device according to FIG. 9 situated thereon and a transport shelf situated thereon, and FIG. 18 shows a top view of the AGV according to FIG. 8, with a handling device according to FIG. 9 situated thereon and a transport shelf situated thereon together with a production shelf.

The drawings in part are highly schematic in the form of sketches, and the detail is reduced considerably to the level essential for understanding the invention.

FIG. 1 is a highly schematic illustration of a production system 2 for the series production in particular of motor vehicles, having an assembly line symbolized by a dash-dotted line 4 in FIG. 1.

In the series production of motor vehicles, so-called A, B, and C parts are used, the C parts being bulk material with no particular value. In particular C parts are delivered in material containers, also referred to below as containers for short. The production system 2 has a container storage area 6 for storing containers that contain components intended for the production. Production shelves are situated on both sides of the assembly line 4, remote from the container storage area 6, from which containers containing components may be removed by workers. Only one production shelf by way of example is provided with reference numeral 8 in FIG. 1.

One important logistical task is to ensure that in the production system 2, a sufficient number of containers containing components necessary for the production are always available on the production shelves 8. One logistical subtask is to transport containers, filled with components, from the container storage area 6 to the production shelves 8, and to deliver them to the containers corresponding to the individual picking shelves 8, depending on the need for components. For transporting containers from the container storage area 6 to the production shelves 8, a transport means is provided, which according to the invention has at least one automated guided vehicle (AGV) within the scope of an automated guided system (AGS). A single AGV is indicated strictly symbolically in FIG. 1 and provided with reference numeral 10. However, a plurality of AGVs may be provided in the production system 2, depending on the particular requirements.

According to the invention, at least one AGV 10 is configured and designed in such a way that containers are or maybe automatically delivered to the production shelves 8.

The AGV 8 is controlled via radio by a central apparatus, for example a central control computer, by means of which all logistical operations within the production system are coordinated, in the illustrated embodiment the radio connection being established via a WLAN.

The AGV 10 is controllable in the container storage area 6 into a loading position, shown in FIG. 1, in which the AGV 10 is loaded with filled containers. The loading of the AGV 10 with filled containers may take place manually by a logistician. This embodiment has the advantage that the container storage area 6 does not have to be changed in order to make use of the invention. However, according to the invention a means for automatically or semiautomatically loading the AGV 10 with filled containers may also be provided in the loading area. According to the invention, this means may be provided, for example, by a handling apparatus or in some other way.

To report a need for components to one of the production shelves 8, a sensor means is provided at at least one production shelf 8 which senses whether a container is present at a predetermined location on the production shelf. The sensor means may have an optical sensor or at least one electromechanically operating sensor, for example, as known from DE 20 2007 012926 U1, for example, the contents of which are hereby incorporated in full into the present patent application.

An operating path is formed on each of the production shelves 8, and in particular may be designed as a roller conveyor and as an inclined plane, and runs on the container in which the components necessary for the series production are accommodated. Containers that are situated on the same operating path, and thus in the same production shelf, are generally the same components.

With regard to one embodiment of an electromechanically operating sensor of the sensor means, reference is made once again to DE 20 2007 012926 U1, in which it is shown and described that a probe of an electromechanically operating sensor protrudes into the operating path in order to sense whether a material container is present at that time at the location where the sensor is situated. However, it is also possible for a worker to place an empty material container on a deposition surface provided for this purpose, and for a determination to be made via an appropriate sensor means whether a material container is present at that time on this deposition surface, and accordingly, there is a need for a supplementary delivery of components.

According to the invention, the sensor means may generate a requirement notification signal when no container is present at the predetermined location, for example on the production shelf. The requirement notification signal is transmitted via radio to the central apparatus for material demand planning. A plurality of signals that indicate a need for different components at different locations in the production process thus pass to the central apparatus.

A route of the AGV 10 is symbolized by a dashed line 12 in FIG. 1, this route leading in a loop from the container storage area 6 to the production shelves 8. Any given routes may be provided according to the invention, depending on the particular requirements. The manner in which an AGV travels along a predetermined route and is controlled is generally known to those skilled in the art, and therefore is not explained in greater detail here.

According to the invention, a transport trip of the AGV 10 may be initiated, for example, as a function of at least one requirement notification signal of the sensor means provided on the production shelves 8. The logistical task of transporting material in containers in a timely manner to the production shelves in such a way that there are always a sufficient number of the necessary components available here, but at the same time, designing transport trips of the AGV to be as economical as possible, for example by approaching different production shelves 8 during a transport trip and at that location delivering containers containing different materials, is achieved by appropriate control in the central apparatus.

However, it is also possible according to the invention to initiate a transport trip of the AGV 10 as a function of at least one requirement control signal of the central apparatus for material demand planning. For example, the material demand at the individual locations in the production process, and thus at the individual production shelves 8, may be estimated based on the advancement in the production process, wherein components are delivered in appropriate containers to the individual production shelves 8, based on the estimate, in accordance with a safety reserve if necessary.

According to the invention, a requirement control may be triggered by a logistician occasionally checking the individual production shelves as to whether a sufficient number of components are still available. A material demand may be communicated to the central apparatus via a suitable technical means, for example via material demand cards which are provided on the individual production shelves, and which for indicating a material demand may be removed and transmitted to the central apparatus.

According to the invention, in a production system the above-described types of requirement notification may also be combined with one another, and optionally also with other methods for requirement notification, at the central apparatus.

The AGV 10 is loaded with filled containers in the loading area, wherein the loading area, for example and in particular, may be formed in the container storage area.

In the loading area, filled containers are scanned before loading the AGV 10; a scanning means for scanning the containers is provided in the loading area for this purpose. In the illustrated embodiment, the scanning means has a scanner for optoelectronically readable characters, in particular a barcode. However, the filled containers may also be scanned in some other way for detection prior to loading of the AGV. For example, the scanning means may have at least one camera.

Thus, for example, within the scope of the method according to the invention a barcode may be affixed to each container. The barcode may be permanently affixed to the container when the same parts are always transported in this container. However, it is also possible to transport different components in the same container during different transport trips of the AGV. An individual barcode is then affixed to each container in accordance with its contents. The particular container is detected by scanning and may be loaded onto the AGV 10.

The design of one embodiment of an AGV according to the invention is explained in greater detail below with reference to FIGS. 2 and 3.

FIG. 2 shows a rear view of the AGV 10. According to the invention, the AGV 10 is configured and designed in such a way that containers may be automatically delivered to the production shelves 8.

After the AGV 10 has been loaded, the central apparatus controls it in such a way that the AGV 10 travels from the loading position to a delivery position, specified by the central apparatus, for delivery of loaded, filled containers to at least one production shelf 8.

In the illustrated embodiment, the delivery means is designed as a passive delivery means and is controlled by the central apparatus.

The delivery means on the AGV 10 has at least one delivery chute on which containers may be situated one behind the other at at least two positions. It is apparent from FIG. 2 that in the illustrated embodiment two delivery chutes 14, 16 are situated one above the other. It is apparent from FIG. 3 that a further delivery chute 14' is situated next to the delivery chute 14, and a further delivery chute 16' is situated next to the delivery chute 16. Only the delivery chute 14 is described in greater detail below. The delivery chutes 16 and 14' and 16' have a similar design, and therefore are not explained in greater detail here.

As is apparent from FIG. 2, the delivery chute 14 is designed as an inclined plane. The delivery chute 14 is also designed as a roller conveyor to facilitate delivery of containers from the delivery chute 14.

As is also apparent from FIG. 2, containers 20, 20', 20" are situated in succession at three positions 18, 18', 18", respectively, in the delivery chute 14. The number of positions 18, 18', 18" for each delivery chute 14 is selectable within a wide range, depending on the particular requirements. Similarly, the number of adjacently situated delivery chutes 14, 14' and 16, 16' and the number of superposed delivery chutes 14, 16 and 14', 16' are selectable within a wide range. Ultimately, the number of positions 18 at which the AGV 10 can be loaded with a container 20 is a function solely of the dimensions of the AGV 10.

According to the invention, at least one blocking element is associated with each delivery chute 14, the blocking element being movable from a blocking position, in which the delivery chute 14 is blocked from delivery of containers, and a delivery position, in which the delivery chute is enabled for delivery of containers.

One embodiment of such a blocking element is illustrated in FIGS. 4 and 5, wherein FIG. 4 illustrates the blocking element in its blocking position, and FIG. 5 illustrates the blocking element in its delivery position.

In the present embodiment, the blocking element is designed as a locking bar 22 that is pivotable about a pivot axis 24 by means of an electromotive rotary drive. In the blocking position illustrated in FIG. 4, the locking bar protrudes into the delivery chute 14 so that the delivery chute is blocked from delivering containers. To allow containers to be delivered from the delivery chute 14, the locking bar 22 is pivoted by means of the associated electromotive rotary drive into the delivery position illustrated in FIG. 5, in which the delivery chute 14 is enabled for delivering the containers 20, 20', 20". Actuation of the electromotive rotary drive of the locking bar 22 maybe controlled by the central apparatus or by a controller provided on the AGV 10, depending on the particular requirements.

If the delivery chute 14 is "type-sorted," i.e., loaded solely with containers that contain the same components, according to the invention it is sufficient for a single blocking element 22, situated at the front end of the delivery chute 14 in the delivery direction, i.e., at the left end of the delivery chute 14 in FIG. 2, to be associated with the delivery chute 14.

To also allow loading that is not "type-sorted," in which the containers situated in the delivery chute 14 contain different components, in the illustrated embodiment a separation means is assigned for individually delivering containers from the delivery chute 14. The separation means is designed in that a blocking element is associated with each of the individual positions 18, 18', 18" of the delivery chute 14, as illustrated in FIGS. 4 and 5. The blocking elements associated with the positions 18, 18', 18" are controllable independently of one another.

The loading of an AGV 10 is completed as follows:

For loading, the AGV 10 is controlled into a loading position in which it is situated, for example, in front of the container storage area 6. A logistician removes containers from the container storage area 6 that are to be loaded onto the AGV 10. The barcode provided on each container is initially scanned. To facilitate the loading, a display means is provided in the loading area for displaying a position on the AGV 10 that is provided for the particular container.

In the illustrated embodiment, the display means has a touchscreen on which the AGV 10 is symbolically depicted. After the barcode of a container is scanned, the particular position in the particular delivery chute of the AGV 10 where the container is to be positioned is displayed on the touchscreen. The logistician then places the container at the displayed position and confirms the partial loading operation, thus performed, on the touchscreen.

A further container may then be scanned and loaded onto the AGV 10. This partial loading operation is repeated until all containers to be transported by the AGV 10 in the pending transport trip have been loaded onto the AGV 10 or all positions of the AGV 10 are occupied with containers.

The distribution of containers on an AGV 10 or a plurality of AGVs is controlled by the central apparatus.

The containers to be loaded onto the AGV 10 may also be identified in some other way than a barcode or other types of optoelectronically readable characters. For example, the containers may be scanned using a camera, or the individual containers may be provided with a transponder, for example an RFID transponder. A locating means for automatically identifying and/or locating containers on the AGV 10 may be provided to check the arrangement of the containers on the AGV 10. In one embodiment in which the individual containers are provided with an RFID transponder, this locating means may have a reading apparatus for the transponder situated on the particular container. The correct loading of the AGV 10 with containers may be checked in this way.

After loading is completed, the central apparatus controls the AGV 10 in such a way that the AGV travels from the loading position to a delivery position, specified by the central apparatus, for delivery of loaded, filled containers to at least one production shelf 8.

FIG. 6 shows the production shelf 8 in a side view, while FIG. 7 illustrates the production shelf 8 in a view from the front. The production shelf 8 has storage chutes 28, 30 situated one on top of the other, which, analogously to the delivery chutes 14, 16 of the AGV 10, may be designed as an inclined plane with a roller conveyor. FIGS. 6 and 7 illustrate the production shelf 8 in a state in which it is filled with containers, of which three containers are denoted by reference numerals 32, 32', 32" by way of example in FIG. 6. As is apparent from FIG. 7, two operating paths 34, 34' and 36, 36' are in each case situated next to one another in the storage chutes 28, 30, respectively.

To automatically deliver the container 20, for example, from the delivery chute 14 of the AGV 10 to the storage chute 28 of the production shelf 8, the AGV is positioned by the central apparatus, optionally with the assistance of a controller provided on the AGV 10, in front of the production shelf 8 in such a way that the delivery chute 14 of the AGV 10 is in flush alignment with the storage chute 28 of the production shelf 8.

In this delivery position, the locking bar associated with the position 18 in the delivery chute 14 is controlled from the blocking position illustrated in FIG. 4 into the delivery position illustrated in FIG. 5, so that the container 20 rolls down over the roller conveyor of the delivery chute 14, designed as an inclined plane, by the action of gravity and is delivered into the storage chute 28 of the production shelf 8. Since the locking bars associated with the positions 18', 18" of the delivery chute 14 are still in their blocking position, the containers 20', 20" remain in the delivery chute 14. However, if necessary, depending on the particular material demand on the production shelf 8, the containers 20', 20" may also be delivered, at the same time as the container 20 or subsequently, to the storage chute 28 of the production shelf 8.

A sensor means may be provided to check that one or more containers have actually been delivered to the production shelf 8 in the desired manner.

In the illustrated embodiment, the AGV 10 is designed for accommodating empty containers on the production shelves 8. As is apparent from FIGS. 2 and 3, the AGV 10 has a receiving chute 38 for empty containers above the delivery chute 14. It is apparent from FIG. 3 that two operating paths 40, 40' are adjacently situated in the receiving chute 38. The operating paths 40, 40' have a design analogous to the delivery chutes 14 of the AGV, and are each designed in the manner of an inclined plane having a roller conveyor, the inclination of the inclined plane of the receiving chute 38 being opposite that of the delivery chute 14.

As is apparent from FIG. 6, for example, a delivery chute 42 having two laterally adjacent operating paths 44, 44' is situated on the production shelf 8 (see FIG. 7). The operating paths 44, 44', analogously to the delivery chutes 14, 16 of the AGV 10 and the storage chutes 28, 30 of the production shelf 8, are designed as an inclined plane with roller conveyors, the inclination of the inclined plane being opposite that of the storage chutes 28, 30.

The delivery of empty containers from the delivery chute 42 of the production shelf 8 to the receiving chute 38 of the AGV 10 may take place simultaneously with the delivery of containers from the AGV 10 to the production shelf 8, or before or after same.

In the sense of an automatic delivery of the empty containers to the AGV 10, a blocking element, for example, may be associated with the delivery chute 42 of the production shelf 8, as described with regard to the AGV 10 with reference to FIGS. 5 and 6. For example, the operating path 44 for delivering empty containers to the AGV 10 may be enabled by appropriate control, the empty containers then moving over the roller conveyor, to the right in FIG. 6, due to gravity and received by the receiving chute 38 of the AGV 10. At the front end of the receiving chute 38 in the flow direction, i.e., at the right end in FIG. 2, a blocking element that may have a design as described with reference to FIGS. 5 and 6 may once again be associated with the operating paths 40, 40'. The blocking element in its blocking position prevents empty containers accommodated in the receiving chute 38 from rolling further across the lateral boundary of the AGV 10 due to gravity.

For an automatic delivery of empty containers from the AGV 10 to the container storage area 6, for example, the blocking elements associated with the operating paths 40, 40' of the receiving chute 38 may then be controlled in their delivery position.

The receiving chute 38 of the AGV is vertically adapted to the delivery chute 42 of the production shelf 8 in such a way that the front end of the delivery chute 42 in the flow direction is at the same height as in the rear direction of the receiving chute 38 in the flow direction when the AGV 10 is situated in front of the production shelf 8.

After filled containers from the AGV 10 are delivered to the production shelf 8 and empty containers are received by the AGV 10, the transport trip of the AGV may be continued with control by the central apparatus. For this purpose, the AGV 10 may either approach further production shelves to deliver filled containers and/or receive empty containers, or may return to the container storage area 6.

In the container storage area, the AGV 10 may once again receive filled containers in preparation for a further transport trip. A receiving means for automatically or semiautomatically receiving empty containers by an AGV 10 may be provided in an empty container transfer area, which may be formed in the container storage area 6, for example. However, it is also possible according to the invention for empty containers that an AGV 10 has brought from a transport trip to be manually unloaded by logisticians in the container storage area.

According to the invention, it is also possible to provide, in addition to the AGV 10, at least one "empty container AGV" whose primary task is to pick up empty containers from the production shelves 8. The control of one or more AGVs is generally known to those skilled in the art, and therefore is not explained in greater detail here. In particular, the AGVs used may travel on different routes, wherein bypass loops, for example, may be provided.

In order for the central apparatus, for example, to be always informed of the position of an AGV 10, according to the invention a means for position determination and/or display of at least one AGV may be provided. The exact location of an AGV may thus be determined at any time. This is particularly advantageous when a malfunction occurs.

All of the above-described control operations for controlling the AGV 10 and its components as well as further automatic or semiautomatic components of the production system may be carried out by the central apparatus. However, according to the invention it is also possible for at least a portion of the control operations, in particular of the AGV 10, to be carried out by a controller provided on the AGV 10. The invention thus provides a production system and an AGV 10 by means of which the delivery of material in a production system for the series production in particular of motor vehicles may be largely automated.

One alternative embodiment of an AGV designed according to the invention is explained in greater detail below with reference to FIGS. 8 through 18.

FIG. 8 shows a perspective view of an AGV in the form of a self-driving forklift 50, which in this embodiment is controlled by laser navigation. The design and operating principle of such automated guided vehicles are generally known to those skilled in the art, and therefore are not explained in greater detail here.

FIG. 9 illustrates one embodiment of a handling device 52 that is situated on the AGV 50 during operation of the production system. The handling device 52 has a base body 54, which in this embodiment is frame-like, and which is connected to the AGV 50 during operation of the production system; situated on the base body is a handling unit 56 that is designed for removing containers from a transport shelf in a conveying direction and delivering containers to at least one production shelf.

According to the invention, the handling unit 56 is adjustable relative to the base body 54 along adjustment axes, symbolized by arrows in FIG. 9.

In particular, the handling unit 56 is linearly adjustable relative to the base body 54 along a first linear adjustment axis in a conveying direction (arrow 58), and along a second linear adjustment axis transverse to the conveying direction (arrow 60). In addition, the handling unit 56 is height-adjustable relative to the base body 54 along a third linear adjustment axis (arrow 62), and is also connected to the base body 54 so as to be rotatable about an essentially vertical fourth adjustment axis (arrow 64).

The linear adjustment axes 58, 60, and 62 are implemented by linear guides, and the rotational axis 64 is implemented by a rotary guide.

Electric motor drives in the illustrated embodiment which are independently controllable by a control apparatus are associated with the adjustment axes 58 through 64, and during operation of the production system are supplied with power via a battery that is present on the AGV 50.

The handling unit 56 has a fork-like supporting element 66 for supporting a container to be handled. The supporting element 66 is situated on a carriage 68 and is adjustable relative to same along the first adjustment axis 58. The carriage 68 is adjustable relative to the base body 54 along the second adjustment axis 60, and is rotatable relative to the base body 54 about the rotational axis 64. In addition, the carriage 68 is height-adjustable along the third adjustment axis 62, along a column 70 of the base body 54 along the third adjustment axis 62.

In the illustrated embodiment, the supporting element 66 has a conveying means for conveying a container to be handled in the conveying direction and opposite the conveying direction, in the illustrated embodiment 4 this conveying means having conveyor belts 72, 74, 76, 78 that extend on the supporting element 66 in the conveying direction and are spaced apart from one another transverse to the conveying direction, and that are independently controllable by a control apparatus.

FIG. 11 shows the AGV 50 with a handling device 52 situated thereon. The handling device 52 may be fixedly connected to the AGV 50. The handling unit 56 is preferably detachably but nondisplaceably connected to the AGV 50.

FIG. 12A shows the AGV 50 with the handling unit 56 situated thereon, as well as a transport shelf 80 situated thereon in which containers to be transported by means of the AGV 50 are accommodated, and of which only two containers are denoted by reference numerals 82 and 84 in FIG. 12A. The transport shelf 20 may be fixedly connected to the AGV 50. However, similarly to the handling unit 56, the transport shelf 80 is preferably detachably but nondisplaceably connected to the AGV 50.

With reference to FIG. 12B through 18, the operating principle of the invention is explained in greater detail below, based on a removal of the container 82 from the transport shelf 80 and delivery or transfer to a production shelf.

As symbolized by an arrow 86 in FIG. 12B, for removing the container 82 the supporting element 66 is initially height-adjusted along the third adjustment axis 62 until it is at the height of the container 82. The corresponding position of the supporting element is illustrated in FIG. 13A.

As symbolized by an arrow 88 in FIG. 13A, in this position the supporting element 66 is adjusted until the supporting element 66 engages below the base of the container 84 and the container 84 thus rests on the conveyor belts 72 through 78 of the supporting element 66. The corresponding position of the supporting element 66 is illustrated in FIG. 13B.

FIG. 14 illustrates how the container 82 is supported on the conveyor belts 72, 74, so that by appropriate actuation of the conveyor belts 72, 74 it may be conveyed in the conveying direction and removed from the transport shelf 80.

After the conveyor belts 72, 74 have conveyed the container 82 in the conveying direction toward the column 70, as indicated by an arrow 90 in FIG. 15A, the supporting element 66 is pulled away from the transport shelf 80 in the conveying direction, as indicated by an arrow 92 in FIG. 15A, until the supporting element 66 is released from the transport shelf 80.

If a misalignment occurs during removal of the container 82, so that the side surfaces of the container 82 are not in parallel with the conveyor belts 72, 74, this misalignment may be corrected by controlling the conveyor belts 72, 74 to briefly run in opposite directions.

FIG. 15B shows the resulting position of the container 82.

Figure 17A:
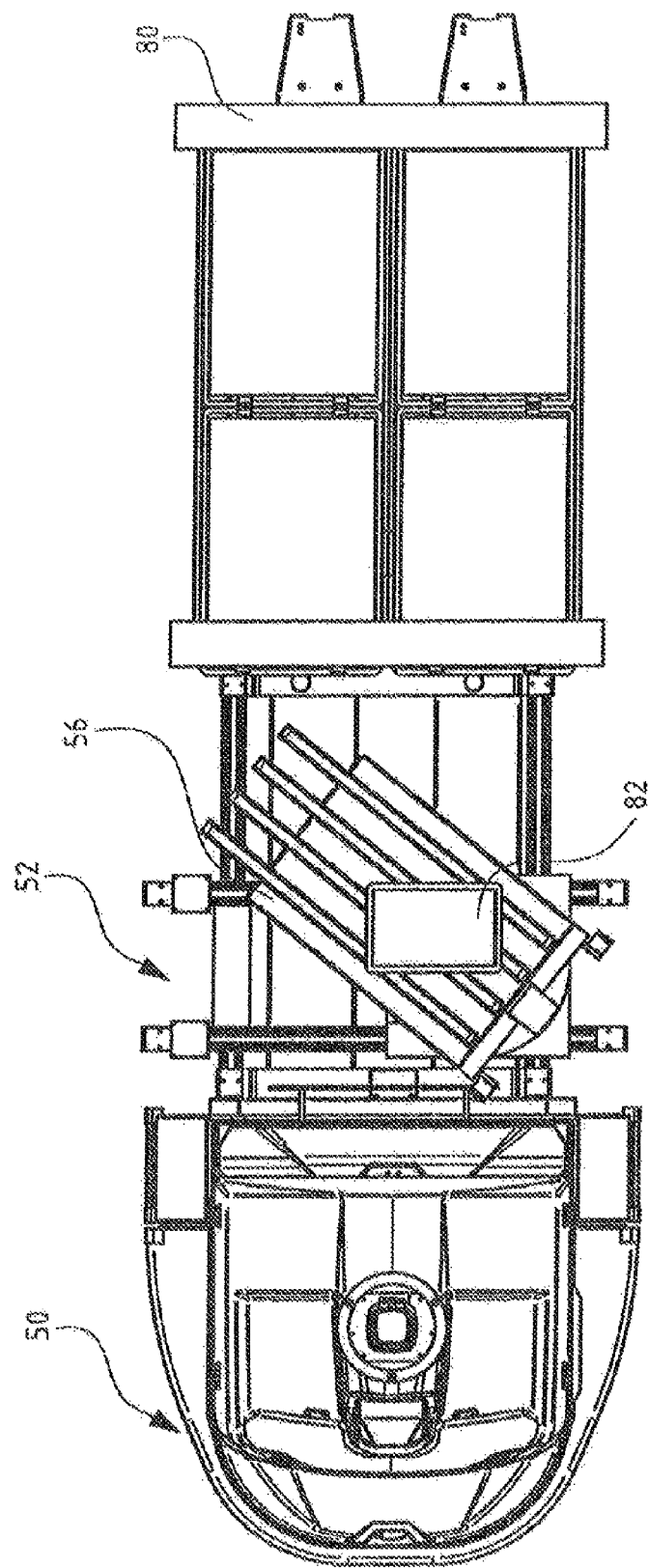

By appropriate control of the conveyor belts 72 through 78, the rotational position of the container 82 is subsequently changed by rotating it by 90 degrees, as indicated by an arrow 94 in FIG. 16. At the same time, the handling unit 56 is rotated counterclockwise about its rotational axis 64 in FIG. 16, as also illustrated in FIG. 17A.

FIG. 17B illustrates the resulting position of the handling unit 56, in which it is rotated counterclockwise by 90 degrees in FIG. 17B with respect to the position for removal of the container 82 from the transport shelf 80.

As is apparent from FIG. 18, the AGV 50 subsequently moves in front of a production shelf 96 to which the container 82 is to be delivered. The container 82 is delivered to the production shelf 96 by actuating the conveyor belts 72 through 78 in the conveying direction symbolized by an arrow 98 in FIG. 18.

Due to the multiaxial adjustability of the handling unit 56, with regard to the removal of containers from the transport shelf and the delivery of the containers to a production shelf the invention provides significantly increased flexibility compared to the prior art.

The invention claimed is:

1. A production system for the series production of motor vehicles, comprising:
    a) a container storage area for storing containers that contain components intended for the production,
    b) a plurality of production shelves, remote from the container storage area, from which components may be removed from a container of the containers by workers, and
    c) a transport means for transporting containers from the container storage area to the plurality of production shelves, d) the transport means has at least one automated guided vehicle (AGV) on which a transport shelf is situated and which is designed in such a way that the containers are or may be automatically delivered from the transport shelf to the plurality of production shelves in a conveying direction (delivery direction), e) a handling device is situated on the at least one AGV, the handling device having a base body and a handling unit, situated on the base body, and the handling unit is designed for removing the containers from the transport shelf in a conveying direction and delivering the containers to the plurality of production shelves, and f) a control apparatus is provided, and g) wherein relative to the base body the handling unit
is linearly adjustable along a first linear adjustment axis in the conveying direction, and
is linearly adjustable along a second linear adjustment axis transverse to the conveying direction, and
is height-adjustable along a third adjustment axis, and
is connected to the base body so as to be rotatable about an essentially vertical fourth adjustment axis, and
electric motor drives that are independently controllable by the control apparatus are associated with the first, second, third, and fourth adjustment axes.

2. The production system according to claim 1, wherein:
a) the handling unit has at least one fork-like supporting element for supporting a container of the containers to be handled.

3. The production system according to claim 2, wherein:
a) at least one supporting element has a conveying means for conveying a container of the containers to be handled in the conveying direction and opposite the conveying direction.

4. The production system according to claim 3, wherein:
a) the conveying means has at least one conveyor belt that extends in the conveying direction.

5. The production Production system according to claim 3, wherein:
a) the conveying means has at least two spaced-apart conveyor belts situated in parallel.

6. The production system according to claim 5, wherein:
a) the at least two conveyor belts are independently controllable by a control apparatus.

7. The production system according to claim 6, wherein:
a) for conveying a container of the containers situated on the conveyor belts in the conveying direction, the control apparatus controls the conveyor belts in such a way that they run in the same direction.

8. The production system according to claim 6, wherein:
a) for changing the rotational position of a container of the containers situated on the conveyor belts in the conveying direction, the control apparatus controls at least two conveyor belts in such a way that they run in opposite directions.

9. The production system according to 1, wherein:
a) a sensor means for determining the position of the handling unit relative to a shelf, is provided, the sensor means being in data transmission connection with the control apparatus in such a way that the control apparatus controls the drives associated with the adjustment axes as a function of the position, determined by the sensor means, of the handling unit relative to the shelf in order to remove a container of the containers from the shelf or deliver a container of the containers to the shelf.

10. The production system according to claim 9, wherein:
a) the sensor means has at least one optical sensor.

11. The production system according to claim 2, wherein:
a) the supporting element is designed in such a way that it is movable beneath the base of a container of the containers in order to handle a container of the containers that is accommodated in a shelf.

* * * * *